US012644981B2

(12) United States Patent
Bowers et al.

(10) Patent No.: US 12,644,981 B2
(45) Date of Patent: Jun. 2, 2026

(54) SYSTEM, METHOD, AND SATELLITES FOR SURVEILLANCE IMAGING AND EARTH OBSERVATION USING SYNTHETIC APERTURE RADAR IMAGING

(71) Applicant: MDA Systems Ltd., Richmond (CA)

(72) Inventors: John Bowers, Surrey (CA); Wayne Hoyle, North Vancouver (CA); Pat Malaviarachchi, Vancouver (CA); Mark Senez, New Westminster (CA); Ryan Oglow, Surrey (CA); Alan Thompson, Vancouver (CA); Jelena Sirovljevic, Burnaby (CA); Terence Lee, Vancouver (CA)

(73) Assignee: MDA Systems Ltd., Richmond (CA)

( * ) Notice: Subject to any disclaimer, the term of this patent is extended or adjusted under 35 U.S.C. 154(b) by 193 days.

(21) Appl. No.: 18/245,604

(22) PCT Filed: Sep. 16, 2021

(86) PCT No.: PCT/CA2021/051298
§ 371 (c)(1),
(2) Date: Mar. 16, 2023

(87) PCT Pub. No.: WO2022/056638
PCT Pub. Date: Mar. 24, 2022

(65) Prior Publication Data
US 2024/0103156 A1    Mar. 28, 2024

Related U.S. Application Data

(60) Provisional application No. 63/079,411, filed on Sep. 16, 2020.

(51) Int. Cl.
*G01S 13/64* (2006.01)
*G01S 13/90* (2006.01)

(52) U.S. Cl.
CPC .......... *G01S 13/9005* (2013.01); *G01S 13/64* (2013.01); *G01S 13/9021* (2019.05)

(58) Field of Classification Search
CPC .. G01S 13/9005; G01S 13/64; G01S 13/9021; G01S 7/003; G01S 7/417;
(Continued)

(56) References Cited

U.S. PATENT DOCUMENTS 4,727,373 A    2/1988 Hoover
6,552,678 B1    4/2003 Adragna
(Continued)

FOREIGN PATENT DOCUMENTS

JP    05061963 A    3/1993
JP    2019175142 A    10/2019
WO    WO-2018197585 A1 * 11/2018 ........... G06V 20/176

OTHER PUBLICATIONS

Extended European Search Report issued on European Patent Application No. 21867992.6 on Sep. 16, 2024.
(Continued)

*Primary Examiner* — Robert W Hodge
*Assistant Examiner* — Bongani Jabulani Mashele
(74) *Attorney, Agent, or Firm* — Own Innovation; Kent C. Howe; James W. Hinton

(57) ABSTRACT

A system and method for satellite imaging are provided. The system includes a first satellite, a trailing satellite, and a ground terminal. The first satellite acquires synthetic aperture radar (SAR) image data in a first predetermined signal frequency band at a first imaging location and transmits the SAR image data to a ground terminal. The ground terminal determines a second imaging location from the SAR image data and transmits the second imaging location to the trailing satellite. The trailing satellite acquires higher resolution image data in a second predetermined signal frequency band
(Continued)

at the second imaging location and transmits the image data to the ground terminal. Systems and methods for satellite imaging are also provided in which a first satellite captures image data and processes the image data onboard to generate a processed product which is transmitted to a receiving terminal at a ground terminal or on a second satellite.

20 Claims, 17 Drawing Sheets

(58) Field of Classification Search
        CPC .... G01S 13/9027; G06V 20/13; G06V 20/52;
                        G08G 3/00; G08G 5/22; G08G 5/727
        See application file for complete search history.

(56)                         References Cited

U.S. PATENT DOCUMENTS

| | | | |
|---|---|---|---|
| 9,123,134 B2 | 9/2015 | Anno et al. | |
| 2018/0172823 A1* | 6/2018 | Tyc | B64G 1/2423 |
| 2018/0172824 A1* | 6/2018 | Beckett | G01S 13/9027 |
| 2018/0239948 A1* | 8/2018 | Rutschman | G06T 7/20 |

OTHER PUBLICATIONS

Guy Thomas: "Civilian Earth Observation Satellites for Global Maritime Awareness", Coast Guard Proceedings, Aug. 10, 2010 (Aug. 10, 2010), pp. 38-40, XP055030326, Retrieved from the Internet: URL:http://www.uscg.mil/proceedings/archive/2010/Vol67_No2_Sum2010.pdf [retrieved on Jun. 19, 2012]* p. 39, right-hand col. lines 1-31 ** p. 40, left-hand col. lines 33-48 *.

Maria Daniela Graziano et al: "Constellation analysis of an integrated AIS/remote sensing spaceborne system for ship detection", Advances in Space Research, Elsevier, Amsterdam, NL, vol. 50, No. 3, Apr. 18, 2012 (Apr. 18, 2012), pp. 351-362, XP028430042, ISSN: 0273-1177, DOI: 10.1016/J.ASR.2012.04.020 [retrieved on Apr. 26, 2012] * figure 7 ** p. 359 left-hand col. line 7—p. 360, right-hand col. line 5 *.

Japanese Office Action for Japanese Patent Application No. 2023-517993 dated Jun. 3, 2025.

CIPO as International Searching Authority, International Search Report and Written Opinion for PCT/CA2021/051298, Jan. 17, 2022.

* cited by examiner

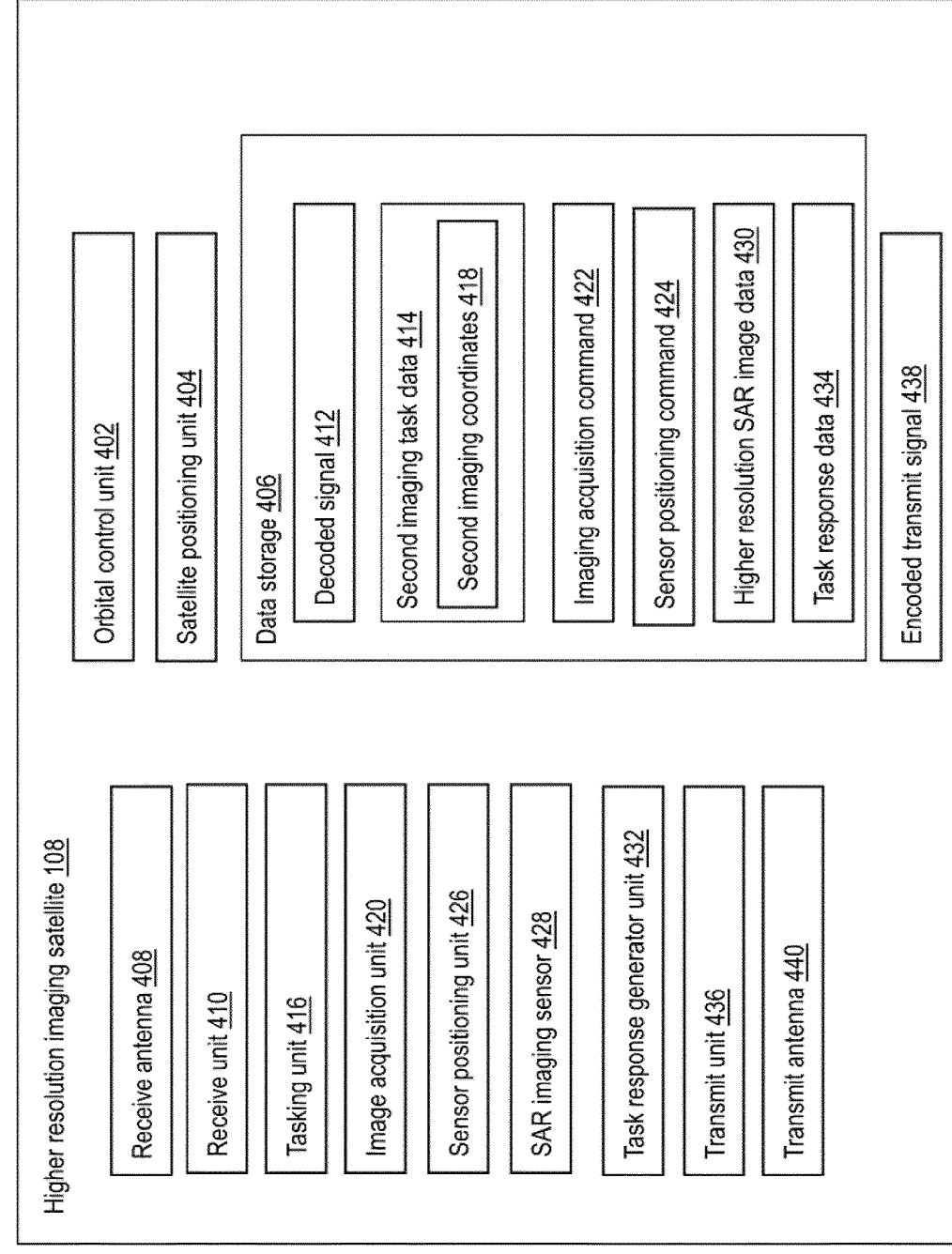

FIG. 4

Higher resolution imaging satellite 108

Receive antenna 408

Receive unit 410

Tasking unit 416

Image acquisition unit 420

Sensor positioning unit 426

SAR imaging sensor 428

Task response generator unit 432

Transmit unit 436

Transmit antenna 440

Orbital control unit 402

Satellite positioning unit 404

Data storage 406

Decoded signal 412

Second imaging task data 414

Second imaging coordinates 418

Imaging acquisition command 422

Sensor positioning command 424

Higher resolution SAR image data 430

Task response data 434

Encoded transmit signal 438

400

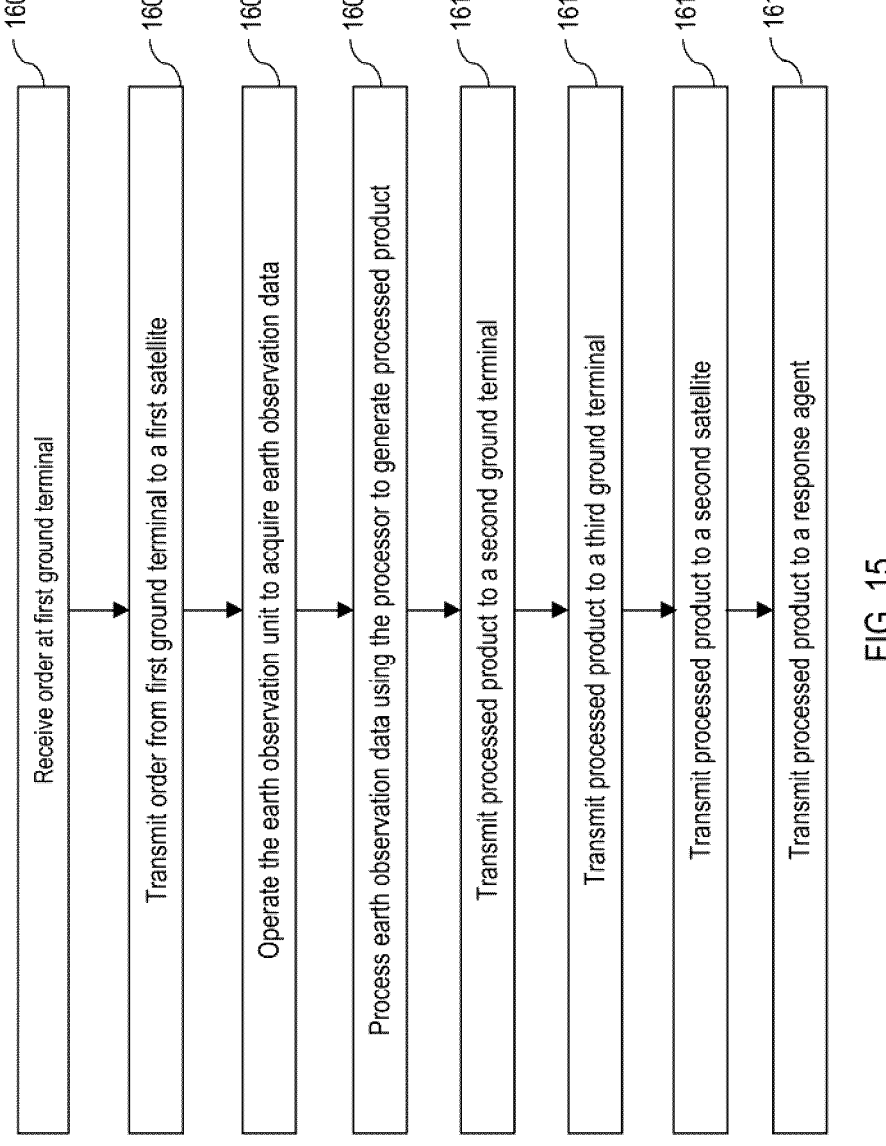

Receive order at first ground terminal — 1602

Transmit order from first ground terminal to a first satellite — 1604

Operate the earth observation unit to acquire earth observation data — 1606

Process earth observation data using the processor to generate processed product — 1608

Transmit processed product to a second ground terminal — 1610

Transmit processed product to a third ground terminal — 1612

Transmit processed product to a second satellite — 1614

Transmit processed product to a response agent — 1616

SYSTEM, METHOD, AND SATELLITES FOR SURVEILLANCE IMAGING AND EARTH OBSERVATION USING SYNTHETIC APERTURE RADAR IMAGING

TECHNICAL FIELD

The following relates generally to earth observation and satellite imaging, and more particularly to satellite-based observation and surveillance using multiple satellites and/or with onboard image data processing.

INTRODUCTION

Although ground-based and aircraft platforms may be used, satellites provide a great deal of the remote sensing imagery commonly used today. Satellites have several unique characteristics which make them particularly useful for remote sensing of the Earth's surface. One approach to performing such remote sensing includes using synthetic aperture radar ("SAR") imaging techniques.

One particular domain in which satellite imaging is used is earth observation. Various problems in earth observation may benefit from satellite imaging including vessel detection (including the ability to detect non-transmitting dark ships, illegal fishing activity, etc.), land intelligence and change detection, asset and infrastructure monitoring, surface deformation monitoring, oil pollution monitoring, humanitarian assistance and disaster relief (HADR) including flood and earthquake monitoring, agriculture monitoring, and forestry monitoring.

As the demand for satellite-based imaging increases, new systems, methods and satellites are desired that may provide improvements over existing ones.

Additionally, it may be advantageous to process captured observation data, in order to extract useful knowledge from raw capture data. For example, information, such as number and location of a certain type of object within a capture, such as vehicles, geographical information, or other types of information may be extracted from captured data, by processing the captured data. Captured data may be transmitted to a ground terminal or another remote terminal from the observation terminal for processing. Captured data may be generally large in data size, and therefore transmission may require a large amount of time. Long transmission times may correspond to high latency to end users. It may be advantageous to process captured data in a manner to avoid the need to transmit large amounts of data before extracting useful knowledge from the captured data.

The large data size of the captured data may necessitate data compression before transmission to another terminal for further processing. Lossy compression schemes may result in an effective reduction in capture resolution. Reduced effective resolution may reduce the possible use cases of the captured data.

Processing data onboard an observation platform such as a satellite may be more limited or complex than processing data remotely. Onboard processing may be limited by onboard hardware capabilities, such as processing power. If special purpose processing hardware is integrated onboard, mission flexibility may be reduced, as special purpose processing hardware may not be reconfigurable. Similarly, special purpose processing hardware may increase satellite mass, which may increase launch costs, or complicate satellite launch.

Accordingly, there is a need for an improved system and method for earth observation that overcomes at least some of the disadvantages of existing systems and methods.

SUMMARY

A satellite imaging system is provided. The system includes a first satellite, a trailing satellite, and a ground terminal. The first satellite is configured to: acquire synthetic aperture radar (SAR) image data in a first predetermined signal frequency band at a first imaging location, the first imaging location defined by first coordinates; and transmit the SAR image data to the ground terminal via a first downlink. The ground terminal is configured to: determine a second imaging location from the received SAR image data, the second imaging location defined by second coordinates; and transmit the second imaging location to the trailing satellite via a second uplink. The trailing satellite is configured to: acquire image data in a second predetermined signal frequency band at the second imaging location, the image data having a higher resolution than the SAR image data; and transmit the image data to the ground terminal via a second downlink.

The ground terminal may be further configured to determine an image context using the image data.

The first satellite may be in an inclined orbit.

The inclined orbit may have an orbit inclination of approximately 53.5 degrees.

The first satellite may be configured to access latitude extents of approximately +/−62.5 degrees latitude.

The second satellite may be in the same inclined orbit as the first satellite.

The first satellite may be configured to acquire SAR image data having a frequency in the C-band, and the second satellite may be configured to acquire image data having a frequency in the X-band.

The system may further include a second trailing satellite. The ground terminal may be further configured to determine whether to transmit the second imaging location to the trailing satellite or the second trailing satellite.

The ground terminal may determine the image context by providing the image data as input to a machine learning model and the machine learning model generates the image context as an output.

The image data acquired by the trailing satellite may be second SAR image data.

The image data acquired by the trailing satellite may be optical image data.

A method comprising of satellite imaging using satellites having different resolutions is also provided. The method includes: acquiring C-band SAR image data at first imaging coordinates via a first satellite; transmitting the C-band SAR image data from the first satellite to a ground terminal as a first radio frequency (RF) signal; determining, at the ground terminal, second imaging coordinates using the C-band SAR image data; transmitting the second imaging coordinates to a second satellite as a second RF signal; and acquiring X-band SAR image data at the second imaging coordinates using the second satellite.

The method may further include transmitting the X-band SAR image data from the second satellite to the ground terminal as a third RF signal.

The method may further include analyzing the X-band SAR image data to determine an image context.

Analyzing the X-band SAR image data may include providing the X-band SAR image data as input to a machine learning model and generating the image context using the machine learning model.

Analyzing the X-band SAR image data may include generating a human-readable representation of the X-band SAR image data and presenting the human readable representation in a user interface executing on a user terminal.

The C-band SAR image data may be acquired in response to the first satellite receiving first imaging task data from the ground terminal via a first uplink. The first imaging task data may include the first imaging coordinates.

The first satellite may be in an inclined orbit.

The inclined orbit may have an orbit inclination of approximately 53.5 degrees.

The first satellite may be configured to access latitude extents of approximately +/−62.5 degrees latitude.

The second satellite may be in the same inclined orbit as the first satellite.

The method may further include selecting the second satellite from a plurality of satellites configured to acquire X-band SAR image data prior to transmitting the second imaging coordinates.

A method of satellite-based surveillance is provided. The method includes: receiving an imaging task order from an external transmitting terminal at an uplink subsystem of a first surveillance satellite; capturing image data of an area defined by the imaging task order via an image sensor on the first surveillance satellite; processing the captured image data into a processed product having a lower bandwidth than the captured image data by a processing unit on the first surveillance satellite; and transmitting the processed product as an RF signal of a predetermined signal frequency band via a downlink subsystem of the first surveillance satellite to a receiving terminal. Processing the captured image data into a processed product having a lower bandwidth than the captured image data includes: detecting an object belonging to at least one object class in the image data; generating a detected object report including data describing an attribute of the detected object; and generating an image chip of the detected object from the image data. The processed product includes the detected object report and the image chip.

The attribute may include any one or more of a size of the detected object, a geographic location of the detected object, an estimated velocity of the detected object, a heading of the detected object, and a characterization of the detected object.

The at least one object class may be a class of vehicle.

The class of vehicle may be a marine vehicle.

The class of vehicle may be a land-based vehicle.

The class of vehicle may be a spacecraft.

Detecting the object belonging to at least one object class in the image data may be performed via a computer vision object detection technique implemented by the processing unit.

Processing the captured image data may further include: generating masked image data of the image data by masking one or more areas or objects in the image data via the processing unit; and wherein detecting the object belonging to the at least one object class in the image data is performed on the masked image data.

The at least one object class may be a class of marine vehicle, and processing the captured imaged data may further include: performing a land masking operation by the processing unit on the image data prior to detecting the object, wherein the land masking operation masks at least one land mass in the image data.

The method may further include estimating a velocity of the detected object, and including the estimated velocity of the object in the detected object report.

Processing the captured image data into a processed product may further include compressing the image chip according to a data compression technique to generate a compressed image chip, and wherein the image chip included in the processed product is the compressed image chip.

Detecting the object belonging to the at least one object class in the image data may include generating bounding box coordinates defining a portion of the image data containing the detected object and using the bounding box coordinates when generating the image chip of the detected object.

The image sensor may be a synthetic aperture radar (SAR) sensor and the image data may be SAR data.

The method may further include comparing the attribute of the detected object to correlation data to confirm or reject the detected object.

The method may further include removing the detected object report and the image chip of the detected object from the processed product when the detected object is rejected based on the comparison to the correlation data.

The detected object may be a marine vessel, the correlation data may be automatic identification system (AIS) ship tracking data, and the comparison may be performed to determine whether the marine vessel is a transmitting vessel according to the AIS ship tracking data.

Comparing the attribute of the detected object to the correlation data may be performed onboard the first satellite using the processing unit.

The receiving terminal may be a ground terminal.

The receiving terminal may be on a second satellite in orbit.

The second satellite may be in an orbit that is higher than an orbit of the first satellite.

The orbit of the first satellite may be a low-earth orbit (LEO) and the orbit of the second satellite may be a geosynchronous orbit (GEO).

The receiving terminal on the second satellite may be configured to communicate with another receiving terminal on a response agent to communicate information about the detected object.

A method of satellite-based surveillance of marine vessel activity is provided. The method includes: receiving an imaging task order from an external transmitting terminal at an uplink subsystem of a first surveillance satellite; capturing synthetic aperture radar (SAR) data of an area defined by the imaging task order via a SAR sensor on the first surveillance satellite, the area including a marine area; and processing the captured SAR data into a processed product having a lower bandwidth than the captured image data by a processing unit on the first surveillance satellite, the processing including: detecting a marine vessel in the SAR data; generating a detected vessel report including data describing an attribute of the detected marine vessel; and generating an image chip of the detected marine vessel from the SAR data. The processed product includes the detected vessel report and the image chip. The method further includes transmitting the processed product as an RF signal of a predetermined signal frequency band via a downlink subsystem of the first surveillance satellite to a receiving terminal.

The method further includes performing land masking on the SAR data to mask a land mass present in the SAR data to generate masked SAR data, and detecting the marine vessel in the masked SAR data.

The method further includes comparing data about the detected marine vessel determined from the SAR data to automatic identification system (AIS) ship tracking data to determine whether the detected marine vessel matches a transmitting marine vessel according to the AIS ship tracking data.

The AIS ship tracking data may be stored onboard the first satellite, and comparing the data about the detected marine vessel determined from the SAR data to the AIS ship tracking data may be performed by the processing unit.

An earth observation system is provided. The earth observation system includes: a first satellite, comprising: a communication subsystem including an uplink subsystem for receiving an order and a downlink subsystem for transmitting a processed product; an earth observation subsystem, including an earth observation sensor configured to acquire earth observation data according to the order; a processor configured to: receive earth observation data from the earth observation subsystem; and generate a processed product from the earth observation data; and a first ground terminal comprising a communication subsystem including: an uplink subsystem for transmitting an order to the first satellite; and an order receiving unit for receiving a task.

The system may further include: a second ground terminal comprising a communication subsystem, including a downlink subsystem for receiving the processed product from the first satellite; a third ground terminal comprising a communication subsystem for receiving the processed product from the second ground terminal; and a second satellite comprising a communication subsystem including an uplink subsystem for receiving the processed product from the third ground terminal and a downlink subsystem for transmitting the processed product to a response agent.

The system may further include: a second satellite, comprising a communication subsystem, including: an uplink subsystem for receiving the processed product from the third ground terminal; and a downlink subsystem for transmitting the processed product to a response agent.

The order may include capture location data.

The order may include an object of interest.

The processed product output may include the location of all objects of interest within the capture.

The processed product may include image chips of each object of interest.

The processed product may include object characterization.

The object of interest output may include object velocity.

The response agent may be a marine craft.

The response agent may be an aircraft.

The processor may comprise a field programmable gate array.

The first satellite communication subsystem and first ground terminal communication subsystem may communicate through the S-band electromagnetic spectrum.

The earth observation subsystem may include a synthetic aperture radar subsystem.

The processor may execute a masking operation before processing the capture.

The processed product may be encrypted before transmission.

The first satellite may be in low earth orbit.

The second satellite may be in geosynchronous orbit.

A method of earth observation is provided. The method includes: receiving an order at a first ground terminal; transmitting the order from the first ground terminal to a first satellite, the first satellite comprising a processor and an earth observation unit; operating the earth observation unit to acquire earth observation data according to the order; and processing the earth observation data using the processor to generate a processed product.

The method may further include: transmitting the processed product to a second ground terminal; transmitting the processed product from the second ground terminal to a third ground terminal; transmitting the processed product from the third ground terminal to a second satellite; and transmitting the processed product from the second satellite to a response agent.

The method may further include: transmitting the processed product from the first satellite to a second satellite; and transmitting the processed product from the second satellite to a response agent.

The processed product may be transmitted from the second ground terminal to the third ground terminal through a cloud server.

A satellite, comprising an earth observation unit and a processor is provided. The satellite is configured to receive an order from a ground terminal, operate the earth observation unit to acquire earth observation data according to the order, and process the data using the processor to generate processed product.

The satellite may be further configured to transmit the processed product to a second ground terminal.

The satellite may be further configured to transmit the processed product to a second satellite.

A method of earth observation, performed on a first satellite is provided. The first satellite includes a processor and an earth observation unit. The method includes: receiving an order from a first ground terminal; operating the earth observation unit to acquire earth observation data according to the order; and processing the earth observation data using the processor to generate a processed product.

The method may further include transmitting the processed product to a second ground terminal.

The method may further include transmitting the processed product to a second satellite.

A system for satellite-based surveillance is also provided. The system includes a satellite and a receiving terminal. The satellite includes a processing unit and a downlink subsystem. The processing unit is configured to process image data captured by the satellite into a processed product having a lower bandwidth than the captured image data, the processing including: detecting an object belonging to at least one object class in the image data; generating a detected object report including data describing an attribute of the detected object; and generating an image chip of the detected object from the image data. The processed product includes the detected object report and the image chip. The downlink subsystem is configured to transmit the processed product to a receiving terminal. The receiving terminal is configured to receive the processed product.

The receiving terminal may be a ground terminal.

The receiving terminal may be implemented on a second satellite configured to relay the processed product to a response agent.

A satellite is provided. The satellite includes an image sensor configured to capture image data of an area defined by an imaging task order. The satellite further includes a processing unit configured to process image data captured by the satellite into a processed product having a lower bandwidth than the captured image data the processing including: detecting an object belonging to at least one object class in the image data; generating a detected object report including data describing an attribute of the detected object; and generating an image chip of the detected object from the image data. The processed product includes the detected object report and the image chip. The downlink subsystem is configured to transmit the processed product to a receiving terminal.

The image sensor may be a synthetic aperture radar (SAR) sensor, and wherein the image data is SAR data.

A processing unit for use on a satellite is provided. The processor is configured to process image data captured by the satellite into a processed product having a lower bandwidth than the captured image data, the processing including: detecting an object belonging to at least one object class in the image data; generating a detected object report including data describing an attribute of the detected object; and generating an image chip of the detected object from the image data. The processed product includes the detected object report and the image chip.

The attribute may include any one or more of a size of the detected object, a geographic location of the detected object, an estimated velocity of the detected object, a heading of the detected object, and a characterization of the detected object.

The processing may further include estimating a velocity of the detected object and including the estimated velocity in the processed product.

A processing unit for use on a satellite is provided. The processor is configured to: process synthetic aperture radar (SAR) data captured by the satellite into a processed product having a lower bandwidth than the captured SAR data, the processing including: detecting a marine vessel belonging to at least one object class in the SAR data; generating a detected vessel report including data describing an attribute of the detected marine vessel; and generating an image chip of the detected marine vessel from the SAR data. The processed product includes the detected vessel report and the image chip.

The attribute may include any one or more of a size of the detected vessel, a geographic location of the detected vessel, an estimated velocity of the detected vessel, a heading of the detected vessel, and a characterization of the detected vessel.

The processing may further include estimating a velocity of the detected vessel and including the estimated velocity in the processed product.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings:

FIG. 4 is a block diagram of the higher resolution imaging satellite of FIG. 1, according to an embodiment;

FIG. 15 is a flowchart of a method of earth observation with onboard processing, according to another embodiment.

DETAILED DESCRIPTION

Figure 1:
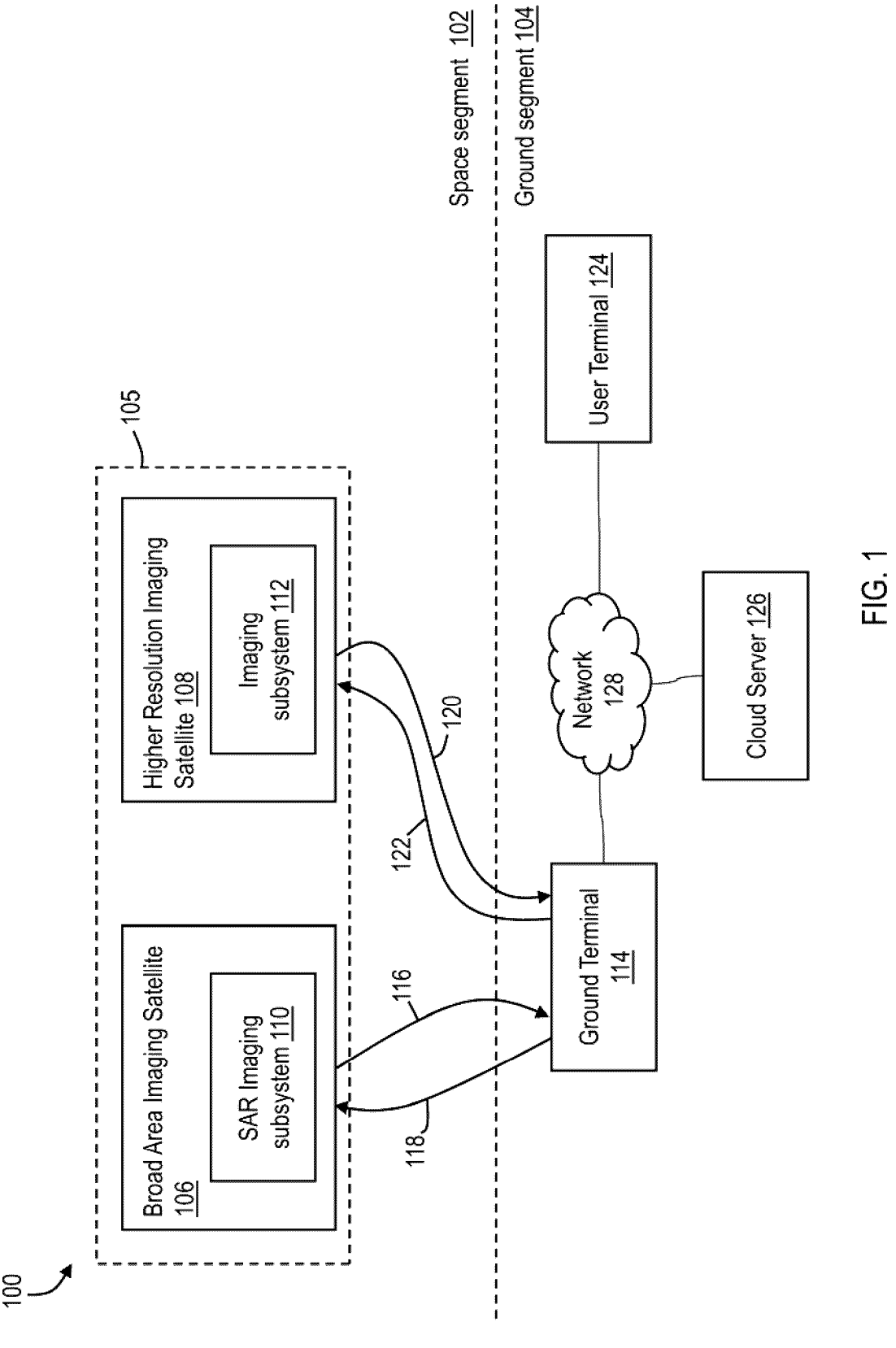
FIG. 1 is a schematic diagram of a satellite imaging system including a broad area imaging satellite and a higher resolution imaging satellite, according to an embodiment.

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

One or more systems described herein may be implemented in computer programs executing on programmable computers, each comprising at least one processor, a data storage system (including volatile and non-volatile memory and/or storage elements), at least one input device, and at least one output device. For example, and without limitation, the programmable computer may be a programmable logic unit, a mainframe computer, server, and personal computer, cloud-based program or system, laptop, personal data assistance, cellular telephone, smartphone, or tablet device.

Each program is preferably implemented in a high-level procedural or object-oriented programming and/or scripting language to communicate with a computer system. However, the programs can be implemented in assembly or machine language, if desired. In any case, the language may be a compiled or interpreted language. Each such computer program is preferably stored on a storage media or a device readable by a general or special purpose programmable computer for configuring and operating the computer when the storage media or device is read by the computer to perform the procedures described herein.

A description of an embodiment with several components in communication with each other does not imply that all such components are required. On the contrary, a variety of optional components are described to illustrate the wide variety of possible embodiments of the present invention.

Further, although process steps, method steps, algorithms or the like may be described (in the disclosure and/or in the claims) in a sequential order, such processes, methods and algorithms may be configured to work in alternate orders. In other words, any sequence or order of steps that may be described does not necessarily indicate a requirement that the steps be performed in that order. The steps of processes described herein may be performed in any order that is practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The following relates generally to satellite imaging, and more particularly to (i) satellite-based earth observation using multiple satellites and (ii) satellite-based earth observation with onboard processing of image data. Concepts associated with satellite-based earth observation using multiple satellites, such as having a broad area imaging satellite and a trailing higher resolution satellite (tip and cue between satellites), and the benefits associated therewith, can be realized with or without onboard processing of image data as described herein. Similarly, concepts associated with satellite-based earth observation with onboard processing of image data, as described herein, and the benefits associated therewith, can be realized with or without multiple imaging satellites (i.e. with or without a trailing higher resolution satellite, with or without tip and cue between satellites).

While the present disclosure refers to earth observation throughout, the systems and methods described herein are not limited to earth observation and may be used for imaging or observing other celestial bodies or space environments.

Earth observation data, such as image data or radar data, may be captured from a remote platform such as an aircraft or spacecraft. Raw captured image data may comprise an extremely large amount of captured data. Captured data generally needs to be processed in some manner in order for the data to provide useful information to an end user. For example, an end user may be interested in viewing a certain subset of the observed area. Captured data may need to be processed to provide an end user with a cropped area of the observed area, such that a user may efficiently review the capture.

Similarly, earth observation may be used for maritime surveillance purposes. For example, captured data may be analyzed to determine the location of all maritime vessels within a captured area. Captured data then needs to be processed to determine the location of all such vessels. Current systems and methods transmit captured data to another terminal for processing. Transmitting large amounts of captured data across common communications links may require a long period of time for transmission. To partially counteract this, compression techniques may be employed to reduce the size of the captured data. Lossy compression techniques may reduce the effective resolution of the captured data, reducing the number of possible use cases of the captured data. For example, in cases where a form of object detection is performed on the captured data (e.g. detecting maritime ships), the effectiveness of the object detection may be compromised or reduced when performed on capture data that has been compressed for transmission.

In the systems and methods of the present disclosure, an earth observation terminal, which may be an earth orbiting satellite, or may be coupled to an earth orbiting satellite, receives an order from a ground terminal to capture earth observation data. This captured data is processed internally, on the earth observation terminal, to extract a desired processed product. The desired processed product may be specified by the order. Instead of transmitting the raw captured data to another terminal for further use, the processed product is transmitted to another terminal for further use. The processed product may have a significantly smaller data size than raw captured data. Transmitting the processed product instead of raw captured data may significantly reduce the latency of an earth observation operation, and may enhance performance of an earth observation system, as uncompressed captured data may be processed, effectively improving system resolution.

In some embodiments, the systems and methods of the present disclosure may be configured to analyze captured data to recognize certain objects of interest captured during observation (e.g. via performance of object detection tasks on the capture data). The observation terminal may process the captured data to locate or detect objects of interest, generating a processed product that comprises coordinate data of all located objects of interest. In some embodiments, the processed product may also comprise an object of interest characterization wherein physical characteristics, such as length and width, of objects are determined, an object of interest velocity, and cropped capture samples of each object of interest. These processed products may be transmitted to another terminal for further use. In examples relating to maritime surveillance, processed products may be transmitted to a marine patrol vessel, such that the patrol vessel may respond to any located unknown marine vessels.

Referring now to FIG. 1, shown therein is a satellite imaging system 100, according to an embodiment.

The system 100 can be used to perform earth observation tasks using a plurality of imaging satellites. Earth observation tasks may include, for example, any one or more of vessel detection, land intelligence and change detection, asset and infrastructure monitoring, surface deformation monitoring, oil pollution monitoring, humanitarian assistance and disaster relief (HADR) including flood and earthquake monitoring, agriculture monitoring, and forestry monitoring. Vessel detection may include detecting non-transmitting dark ships, illegal fishing activity, and the like.

The system 100 may be used to perform cross cueing operations, such as described in greater detail herein. The cross cueing may be SAR-to-SAR cross cueing or SAR-to-optical cross cueing.

The system 100 includes a space segment 102 and a ground segment 104. The ground segment 104 may have a service-oriented cloud architecture. The ground segment 104 includes all elements of the ground including hardware and software (e.g. constellation planning subsystem, ordering, tasking, receiving, image production, archiving, distribution, etc.).

The space segment 102 includes a constellation 105 of imaging satellites including a broad area imaging satellite 106 and a higher resolution imaging satellite 108. The broad area satellite 106 may be a broad area surveillance satellite. The higher resolution imaging satellite 108 may be a high resolution target monitoring satellite. While the satellite constellation 105 of system 100 is shown having two satellite 106, 108, in other embodiments, the satellite constellation 105 may have additional imaging satellites and the number is not particularly limited. In a particular embodiment, the satellite constellation 105 includes at least two higher resolution imaging satellites 108.

In the system 100, the broad area imaging satellite 106 may be considered a "leading satellite" and the higher resolution imaging satellite 108 may be considered a "trailing satellite". The terms "leading" and "trailing" when used herein in reference to satellites is not intended to indicate any particular physical relationship between the leading and trailing satellites but rather refers to the fact that the trailing satellite is used to perform an imaging operation (i.e. acquisition of image data) after and based on an imaging operation performed by the leading satellite. In some cases, the trailing satellite may be considered to physically trail the leading satellite by a period of time (e.g. 1 hour). The period of time may be termed a "pass interval" of the system 100. The pass interval defines a time period between the leading satellite 106 passing over a location (i.e. the location is within the satellite's imaging range or view) and the trailing satellite 108 passing over the same location (i.e. such that the same location, or approximately the same location, can be imaged by both satellites 106, 108). In such cases, the leading satellite 106 generally acquires image data at a location first and the trailing satellite 108 acquires image data at approximately the same location (depending on whether a subject being image is static or in motion) second. As a result, the system 100 is generally configured to perform certain processing and communication steps, such as those performed by the ground segment 104 described herein, within the pass interval such that the efficiency of the system 100 is maximized.

The broad area imaging satellite 106 and higher resolution imaging satellite 108 are each in an orbit. The respective orbits are predefined orbits.

In an embodiment, the broad area imaging satellite 106 is in an inclined orbit. An inclined orbit is defined by its orbital inclination, which is the angle between the plane in which the satellite 106 orbits and a reference plane (i.e. Earth's equator). Further, the inclined orbit may be defined as a non-polar orbit. In an embodiment, the broad area imaging satellite 106 may have an orbital inclination of about 53.5 degrees. In an embodiment, the broad area imaging satellite 106 may have an orbital inclination providing access to image between 62.5 degrees N and 62.5 degrees S. For example, the broad area imaging satellite 106 may be launched into inclined orbit and look left and right (rolling the spacecraft to look left and right of nadir) to provide image points of the earth up to 62.5 degrees N and as low as 62.5 degrees S.

By having an inclined orbit (vs a polar orbit), the broad area imaging satellite 106 may have increased time spent over revenue generating regions of the globe and may allow for imaging at different times of the day and night. Accordingly, the broad area imaging satellite 106 may have an orbit that increases or maximizes time over one or more revenue generating regions. The revenue generating regions are regions outside the polar areas (e.g. Mediterranean, South China Seas, Coasts of N. America, etc.). Coverage of the poles is not generally needed to cover the revenue generating regions. The inclined orbit of the broad area imaging satellite 106 may maximize the time spent in the revenue generating region. The revenue generating regions may be determined by looking at an existing imaging satellite's (e.g. RADARSAT-2) revenue distribution of customers across the globe. For a polar orbit that is sun synchronous, a satellite flies over a point at the same time of day. This is called the "Local Time of the Ascending Node", or LTAN, and is measured as the time the satellite crosses the equator on an ascending pass (meaning going from south to north). On the other hand, for an inclined orbit, there is no fixed LTAN (non-fixed LTAN) as the orbit is constantly precessing. The equator crossing time varies throughout an orbital period. As a result, rather than being limited to monitoring activity at, for example, 6 am and 6 pm at every imaging opportunity, activity can be monitored across varying times of day. Further, in some cases, covert operations may be performed outside of known satellite LTANs. The constantly changing LTANs provided by the inclined orbit of the broad area imaging satellite 106 can make it generally much harder to elude authorities by working around LTANs.

The inclined orbit of the broad imaging satellite 106 may improve the number of imaging opportunities over a particular area in a given day (revisit).

In another embodiment, the broad area imaging satellite 106 is in a mid-inclination orbit. In another embodiment, the broad area imaging satellite 106 is in a sun-synchronous orbit (SSO).

In an embodiment, the broad area satellite 106 (and possibly the higher resolution satellite 108) has an orbit altitude at which each orbit takes approximately 97 minutes (orbit completion time). In the inclined orbit described herein, the 97 minutes is spent flying over a smaller latitude band (+/−62.5 degrees latitude) instead of pole-to-pole (+/−90 degrees latitude). The area around the poles are low revenue regions because other satellites provide "free data" over those regions (e.g. RCM or Sentinel-1). The broad imaging satellite 106 in the inclined orbit, however, spends more time in revenue generating regions. Further, the revisit opportunities of the satellite 106 (i.e. the time elapsed between observations of the sample point on earth by the satellite) may be thereby improved (higher frequency).

Generally, satellite mission providers launch into SSO because it provides truly global+/−90 degree latitude coverage (whereas a satellite in the inclined orbit described herein may only image below 62.5 deg N and above 62.5 deg S). The particular inclined orbit may be selected to maximize the time spent over revenue generating areas.

In an embodiment, the higher resolution imaging satellite 108 has the same orbit inclination as the broad area imaging satellite 106. The higher resolution imaging satellite 108 may have the same orbit altitude and inclination as the broad area imaging satellite 106. In such an embodiment, the higher resolution imaging satellite 108 may trail immediately behind the broad area imaging satellite 106 (for example, the latency between broad area satellite and higher resolution satellite cross-cue may be approximately 1 hr).

In an embodiment, the higher resolution imaging satellite 108 may be in a sun-synchronous orbit (SSO). SSO is a type of polar orbit. Satellites in SSO are synchronous with the sun, such that they pass over an Earth region at the same local time every day. For example, the higher resolution imaging satellite 108 may be part of a commercial satellite constellation which is in SSO. In embodiments where the higher resolution satellite 108 is in SSO, latency in cross cueing between the broad area satellite 106 and the higher resolution imaging satellite 108 may increase and the difficulty in performing tipping and cueing conops described herein as a service may increase (e.g. unless there are hundreds of higher resolution satellites in the constellation to which to cross cue).

Each of the imaging satellites 106, 108 (and more particularly the imaging subsystems thereof) is adapted to acquire imaging data (e.g. SAR data) of a predetermined frequency band (e.g. C-band, X-band, etc.). For example, the broad area imaging satellite 106 may be configured to acquire and transmit C-band SAR data and the higher resolution imaging satellite 108 may be configured to acquire and transmit X-band SAR data. The imaging satellites 106, 108 may be further configured to encrypt and stored the acquired image data.

Each of the imaging satellites 106, 108 is further adapted to transmit the acquired image data to the ground segment 104 and receive instructions and commands from the ground segment 104 via an RF signal of a predetermined signal frequency band.

The imaging satellites 106, 108 each have an imaging swath (image scene size that is collected). The imaging swath of the broad area imaging satellite 106 is greater than the imaging swath of the high-resolution imaging satellite 108. The term "broad area" when used herein in reference to an imaging satellite or otherwise refers to a relative relationship between the imaging swath of the imaging satellite to which it refers and the imaging swath of another imaging satellite in the system. For example, the broad area imaging satellite 106 of system 100 is "broad area" in relation to the higher resolution imaging satellite 108 as its respective imaging swath covers a greater area than that of the higher resolution imaging satellite 108. Further, the imaging satellites 106, 108 each have an accessible swath (region where the satellite can look to capture an image).

In an embodiment of the system 100, the number of higher resolution imaging satellites 108 (or "trailing satellites") used may be based on the imaging swath and accessible swath of the broad area imaging satellite 106 and the respective imaging swaths and accessible swaths of the higher resolution satellites. For example, the system 100 may be configured such that the broad area imaging satellite 106 and the higher resolution imaging satellites 108 have generally overlapping accessible swaths. This may be achieved, for example, by using a plurality (e.g. two) of trailing higher resolution imaging satellites 108. If the broad area satellite 106 accessible swath is covered/duplicated by the higher resolution imaging satellites 108, the imaging swath of the higher resolution satellites 108 may not need to overlap the broad area satellite 106 imaging swath. In such cases, ground processing, such as performed by the ground terminal 114 described below or other component of the ground segment 104, can determine the coordinates of where to take a second image using the higher resolution satellite 108, which is centered on the target of interest (first image via satellite 106 searches broadly, second image via satellite 108 zooms in).

The broad area imaging satellite 106 includes a synthetic aperture radar ("SAR") imaging subsystem 110. The SAR imaging subsystem 110 includes a SAR imaging sensor and is configured to perform SAR imaging operations. The SAR imaging subsystem 110 acquires and stores SAR data.

The SAR imaging subsystem 110 may be configured to have left and right look directions. As the satellite 106 flies in the velocity direction, it can roll left (to look off to the left of the ground track) or right (to look off to the right of the ground track). Each "look" represents an accessible swath (e.g. 700 km wide, 1400 km left and right combined). This is different from the imaging swath, which corresponds to the actual imaged area. Accessible swath and "look directions" describe the area that "could" be imaged by the satellite. The imaging swath is an area within the accessible swath. The satellite 106 may have a large accessible swath compared to existing broad area imaging satellites (e.g. compared to existing C-band radar satellites). A large accessible swath means that more of the earth can be accessed for imaging opportunities with fewer spacecraft. It may be useful to look both left and right as total daily access between latitude bands improves (e.g. +/−62.5 degree latitude bands), otherwise there may be gaps in access where you may need to wait for the next available pass to image. To facilitate left and right look directions, the satellite 106 may include an articulating solar array. The articulating solar array may be a gimballed solar array. The gimballed solar array may point at the sun while the spacecraft slews from left looking to right looking and vice versa.

The SAR imaging subsystem 110 may implement a class-leading access swath that looks left and right (e.g. 700 km wide looking both directions, combined 1400 km). By implementing a wide access swath that can look both left and right, the imaging satellite 106 may provide more frequent revisit and better access over locations of interest.

The SAR imaging subsystem 110 of the broad area imaging satellite 106 includes a SAR antenna. In an embodiment, the SAR antenna has a length of about 13.5 m×1.4 m.

The SAR imaging subsystem 110 may have an accessible swath width of approximately 700 km. Accessible swath refers to the area where the satellite can look within to collect to collect an image. The SAR imaging subsystem 110 may have a widest imaging swath of approximately 700 km. Imaging swath refers to the area that the satellite actually images (i.e. scene size).

The broad area imaging satellite 106 may have a plurality of imaging modes. The imaging modes may include a dual aperture multi-polarization imaging mode.

The broad area imaging satellite 106 may have a maximum imaging time per orbit of 30 minutes.

The broad area imaging satellite 106 may include a direct downlink. Direct downlink refers to downlinking any data (SAR, optical, other) directly to a ground station that is not necessarily the ground headquarters. For example, the satellite 106 may be configured to downlink data directly to regional ground station customers around the world whenever the satellite 106 passes over the regional ground station communications cone. In such cases, the satellite 106 and the ground terminal 114 may be configured with hardware and software to facilitate the direct downlink capabilities. The alternative to direct downlink is to downlink to an HQ station and then send the data via some other means to the end customer, which may add delay to potentially time critical applications.

The broad area imaging satellite 106 may include a high-speed data downlink subsystem. In an embodiment, the high-speed data downlink subsystem may include an X-band downlink. The high-speed data downlink subsystem may be part of the satellite's 106 communications subsystem which transmits payload data (e.g. SAR image data) from the spacecraft to the ground segment 104 using a predetermined signal frequency band (e.g. X-band communications frequencies). The high-speed data downlink subsystem may have a downlink rate of 300 Mbps×2 (or much higher). The high-speed data downlink subsystem may provide downlink speeds which allow more images to be downlinked to a ground station (e.g. ground station 114) within a contact pass between the satellite and the ground station communications cone.

The broad area imaging satellite 106 may be configured to perform direct tasking. Direct tasking may allow regional ground station customers to send a command to task the satellite 106 (an image collection order) directly from their ground station communications cone when the satellite 106 is flying overhead. This is in contrast to sending an order to a ground headquarters and then tasking the satellite, which can add delay. The broad area imaging satellite 106 may be configured to perform fast tasking nearly every orbit. The fast tasking is a type of tasking that is high priority and low latency.

The broad area imaging satellite 106 includes a solar array comprising a plurality of solar panels for generating and providing power to various electrical components of the satellite 106. The solar array may be a gimballed array. The gimballed array may advantageously generate and provide more power to the satellite 106. In a particular embodiment, the broad area imaging satellite 106 may include a gimballed solar array and have an inclined orbit. The gimballed solar array may be configured to advantageously handle the eclipse conditions experienced in an inclined orbit.

The higher resolution imaging satellite 108 includes an imaging subsystem 112. The imaging subsystem 112 may include a SAR imaging sensor and be configured to perform SAR imaging operations. In other embodiments, the imaging subsystem 112 may include an optical imaging sensor instead of or in addition to the SAR imaging sensor. In such cases, the imaging subsystem 112 is configured to perform optical imaging operations.

The higher resolution imaging satellite 108 is configured to acquire and transmit higher resolution image data. The term higher resolution image data (and the term "higher resolution", more generally) as used herein is used to refer to a relative resolution of the image data captured by the imaging satellite 108 as compared to the resolution of the image data captured by the broad area imaging satellite 106. That is, the imaging subsystem 112 of the higher resolution imaging satellite 108 is configured to acquire higher resolution images than the imaging subsystem 110 of the broad area imaging satellite 106.

In an embodiment, the higher resolution imaging satellite 108 is an X-band satellite. In a particular embodiment, the higher resolution imaging satellite 108 is an X-band satellite and the broad area imaging satellite 106 is a C-band satellite.

The higher resolution imaging satellite 108 may be used for target monitoring (and thus be considered a target monitoring satellite). For example, the higher resolution imaging satellite 108 may acquire and provide high resolution SAR imagery for target monitoring applications (such as described herein) that augment the broad area capability of the broad area imaging satellite 106.

Generally, a broad area (lower resolution) SAR image is acquired by the broad area satellite 106 which may be used to tell a user "where" to look. This first imaging operation takes advantage of the broad area surveillance capability (e.g. 700 km accessible swath) of the broad area imaging satellite 106 to look for targets of interest. The broad area SAR image can be used to determine coordinates for a subsequent higher resolution imaging operation. Once the coordinates of the target are determined, the higher resolution satellite 108 is cross cued to take a closer (i.e. higher resolution) look at the same target of interest. Without the first broad area SAR image, the utility of the higher resolution satellite may be more limited as the accessible swaths are generally much lower (e.g. 30 km X-band vs. 700 km C-band). While this may be less of an issue for fixed land-based targets (where to look may already be known), for maritime surveillance applications the first, broad area SAR image can be particularly beneficial, particularly outside port areas when targets are moving.

The imaging satellites 106, 108 each include a bus module in addition to the respective imaging subsystems 110, 112. The bus module provides attitude and orbit control, power generation and storage, payload commands, telemetry, thermal control and the primary support structure.

In some cases, one or both imaging satellites 106, 108 may include additional payloads. For example, the broad area imaging satellite 106 may include an Automatic Identification System (AIS) for ships, which may be used independently or in conjunction with the SAR subsystem 110. In another embodiment, instead of or in addition to having an AIS receiver on board the broad area satellite 106, the system 100 may utilize a third party AIS data provider feeding AIS data directly into the ground segment 104 (e.g. ground terminal 114). For example, the ground terminal 114 may be communicatively connected to an AIS data feeding computer system via network 128 and receive the AIS data from the AIS data feeding system via the network. Embodiments of the system 100 including the AIS data feeding system may provide advantages. For example, third party AIS data providers may have a global constellation of satellites dedicated to AIS and may be able to provide the ground terminal 114 with ship track historical data that can be used to correlate against SAR data generated by the system 100. In cases where there is no AIS data feeding system and only AIS onboard the satellite 106, ship tracking information may only be obtained when the satellite 106 is flying overhead.

Referring now to the ground segment 104 of system 100, the ground segment 104 is used generally to command and monitor the satellites 106, 108 for navigation and imaging, receive satellite telemetry, receive data from the satellites' payloads (e.g. imaging subsystems 110, 112); and manage the data for users.

The ground segment 104 includes a ground terminal 114. The term ground terminal may be used to refer to a single ground terminal or multiple ground terminals. The ground terminal 114 includes components (e.g. antennas, transmitters, receivers) for transmitting signals to and receiving signals from the imaging satellites 106, 108 and components for processing data (e.g. one or more computing devices, software modules). Processing data includes processing image data received from the satellites 106, 108.

The ground terminal 114 includes a data receiving station and a data transmitting station. The data receiving and data transmitting stations may each be configured to receive and transmit, respectively, signals of a predetermined signal frequency band (e.g. X-band, S-band). Data receiving stations and data transmitting stations may be specially adapted to communicate with either the broad area imaging satellite 106 or the higher resolution imaging satellite 108 (e.g. a broad area imaging satellite receiving station, a higher resolution imaging satellite receiving station).

The ground terminal 114 is adapted to receive data from the broad area imaging satellite 106 via downlink 116 and transmit data to the broad area imaging satellite 106 via uplink 118. The data received via downlink 116 includes SAR data acquired by the SAR imaging subsystem 110. The data transmitted via uplink 118 may include imaging task data instructing the satellite 106 to acquire and return SAR data from a particular location (e.g. coordinates).

The ground terminal 114 is adapted to receive data from the higher resolution imaging satellite 108 via downlink 120 and transmit data to the higher resolution imaging satellite 108 via uplink 122. The data received via downlink 120 includes image data acquired by the imaging subsystem 112. The data transmitted via uplink 122 may include imaging task data instructing the satellite 108 to acquire and return higher resolution image data from a particular location (e.g. coordinates).

The ground segment 104 also includes a user terminal 124 and a cloud server 126. The terms user terminal and cloud server may be used to refer to a single user terminal or cloud server or multiple user terminals or cloud servers. The user terminal 124 and cloud server 126 are communicatively connected to the ground terminal 114, and to each other, via network 128. The network 128 may include local area network connections and/or wide area network connections (e.g. the Internet).

The user terminal 124 is a computing device configured to perform data processing functions and transmit data to and receive data from other computing devices such as ground terminal 114 and cloud server 126 via network connections such as network 128.

The user terminal 124 may include a client-side software application configured to communicate with a server-side application running on the cloud server 126 or the ground terminal 114. The client-side software application may include a user interface for receiving input data from a user (e.g. requesting an imaging task, other UI interactions) and outputting data to the user (e.g. displaying processed image data or an output or determination of an image data processing operation performed. The user interface may be a web-based user interface. The user of the user terminal 124 may be an analyst trained to analyze SAR or other image data.

The cloud server 126 may include a cloud-based software application configured to communicate with a client-side software application running on the user terminal 124 or a software application running on the ground terminal 114. For example, the ground terminal 114 may upload image data to the cloud server 126, which may then store the image data linked to a user account, which can be accessed by the user terminal 124.

The ground segment 104 may include a modular instance of data chain to support network station upgrades.

The system 100 may be used to perform maritime cross cueing to detect target vessels. For example, the broad area satellite 106 may collect a broad area SAR image in which a plurality of vessels (e.g. ships) are seen. The ships and ship locations may be correlated by the ground terminal 114 against AIS data from an AIS data feeding system (e.g. AIS data provider who operates its own constellation of AIS satellites). Most ships are likely transmitting an AIS signal broadcasting their respective ID, position, and heading. From this, a determination may be made using the ground terminal 114 identifying the ships in the broad area SAR image that are transmitting AIS. The ships that are not correlated at the ground terminal 114 may be taken to represent leftover dark targets and thus may be considered potential vessels of interest for interdiction of further monitoring. Further monitoring may include tasking the higher resolution satellite 108 to acquire higher resolution SAR image data of the dark targets using coordinates determined from the broad area SAR image.

Figure 2:
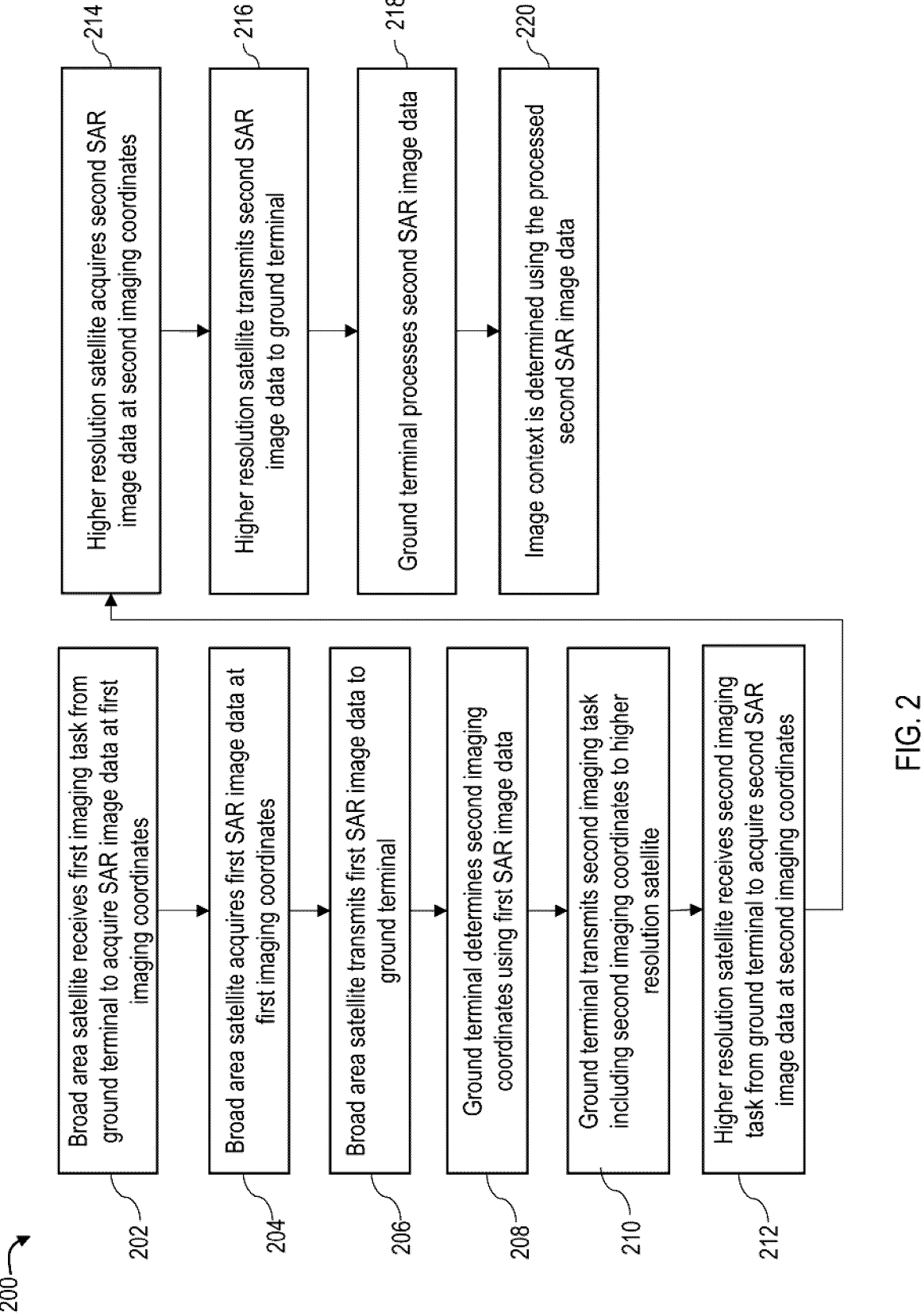
FIG. 2 is a flow diagram of a method of operation of the satellite imaging system of FIG. 1, according to an embodiment.

Referring now to FIG. 2, shown therein is a method 200 of operation of the satellite imaging system 100 of FIG. 1, according to an embodiment.

At 202, the broad area imaging satellite 106 receives first imaging task data from the ground terminal 114 via uplink 118. The first imaging task data describes a first imaging task to be performed by the broad area imaging satellite 106 includes first imaging coordinates and a command/instructions to acquire SAR data at the first imaging coordinates.

The first imaging task may be generated by ground terminal 114. In some cases, the first imaging task may be generated at the ground terminal 114 in response to an imaging task request initiated at the user terminal 124 (e.g. a user at user terminal 124 inputs a task request using the client-side application). The imaging task request may be sent to the cloud server 126 and/or the ground terminal 114 via the network 128. Where the imaging task request is sent to the cloud server 126, the cloud server may process and transmit the imaging task request to the ground terminal 114.

At 204, the broad area imaging satellite 106 acquires first SAR data at the first imaging coordinates using the SAR imaging subsystem 110. The broad area imaging satellite 106 may process, encrypt, and store the SAR data using an on-board processor and memory. The first SAR data is of a first predetermined frequency band. The first SAR data may be C-band SAR data.

At 206, the broad area imaging satellite 106 transmits the first SAR data to the ground terminal 114 via downlink 116. The first SAR data is transmitted as an RF signal of a predetermined frequency band.

At 208, the ground terminal 114 receives the first SAR data. The ground terminal 114 processes the first SAR data to determine second imaging coordinates. The second imaging coordinates can be used in a subsequent "targeted" imaging operation.

Generally, the first SAR data may be at a resolution that allows a determination to be made that a particular object, subject, or image context is present but that is not sufficient to determine the type or nature of the object, subject, or image context. Further, the first SAR data is of a sufficient resolution to determine the second imaging coordinates. For example, the first SAR data may be sufficient to identify that an object is present at a particular location (due to, for example, contrast with surroundings (e.g. water)), but not sufficient to identify the object (e.g. as a particular type of vessel) with a required degree of certainty.

In some cases, step 208 may include determining whether the subsequent imaging operation is needed. For example, upon processing and analysis of the first SAR data, it may be determined that the subsequent imaging operation is not required. This determination may be performed automatically by the ground terminal 114 (e.g. using machine learning techniques) or may include a user input provided at the user terminal 124 (e.g. displaying an output of processing the first SAR data at the user terminal and receiving an input at the user terminal indicating whether to perform the second imaging operation, the input then provided to the ground terminal).

In embodiments where the method 200 is used to image or monitor a moving image subject, the ground terminal 114 is configured to determine a motion artifact for the image subject and use the motion artifact in determining the second imaging coordinates. In such cases, the ground terminal 114 may effectively predict the location (i.e. coordinates) of the image subject at the time of the second imaging operation.

At 210, the ground terminal 114 transmits second imaging task data to the higher resolution imaging satellite 108 via the uplink 122. The second imaging task data describes a second imaging task to be performed by the higher resolution imaging satellite 108 includes the second imaging coordinates and a command/instructions to acquire SAR data at the second imaging coordinates.

In embodiments where the satellite constellation 105 includes multiple higher resolution satellites 108, the ground terminal 114 may also determine to which of the higher resolution satellites the second imaging task should be sent.

At 212, the higher resolution satellite 108 receives the second imaging task data from the ground terminal 114 via the uplink 122.

At 214, the higher resolution satellite 108 acquires second SAR data (or optical data, if the higher resolution satellite 108 is configured to collect optical data) at the second imaging coordinates. The higher resolution imaging satellite 108 may process, encrypt, and store the second SAR data using an on-board processor and memory. The second SAR data is of a first predetermined frequency band. The second SAR data may be X-band SAR data.

As described, the second SAR data is of a higher resolution than the first SAR data.

At 216, the higher resolution imaging satellite 108 transmits the second SAR data to the ground terminal 114 via downlink 120.

At 218, the ground terminal 114 receives and processes the second SAR data.

At 220, an image context is determined using the processed second SAR image data. Determining an image context may include, for example, determining an identity of an object present in the second SAR data (e.g. a vessel).

Determining the image context may include a user input (e.g. an operator trained in analyzing SAR image data). For example, the second SAR data may be provided to the user terminal 124 via the network 128 and displayed in a user interface. The displayed SAR data may then be analyzed by the operator of the user terminal 124. The user may provide input data to the user terminal 124 via the user interface, which may then be provided to one or more other devices connected to the user interface (e.g. ground terminal 114, cloud server 126, or another computer system).

In other cases, determining the image context from the second SAR data may be performed automatically, such as through the application of machine learning techniques.

For example, the ground terminal 114 may include a machine learning module configured to determine an image context from the second SAR data. The machine learning module includes a machine learning model that has been trained using a set of SAR training images. The machine learning model may be a neural network or the like. The machine learning model may be a classification model configured to receive the second SAR data as an input and generate a class assignment or label as an output. The machine learning model may also provide a confidence level with the class label indicated a level of confidence that the class label is accurate. The classification model may be configured to perform a binary classification task in which the input second SAR data is assigned to one of two mutually exclusive classes (e.g. "problem vessel" or "not a problem vessel"). The classification model may be configured to perform a multi-class classification task in which the input second SAR data is assigned one of more than two classes.

In cases where the ground terminal 114 performs machine learning to determine an image context, the image context may be considered the output of the machine learning model (e.g. the class label).

The output of the machine learning module may be provided to the user terminal 114 and displayed in a user interface for review by an operator. In some cases, the output may only be provided to the user terminal upon determination of a particular image context (e.g. assignment of a certain class label). In other cases, the output of the machine learning module may not be provided to the user terminal 124 for review and instead may be transmitted to another computer system for subsequent action or may be further processed.

Figure 3:
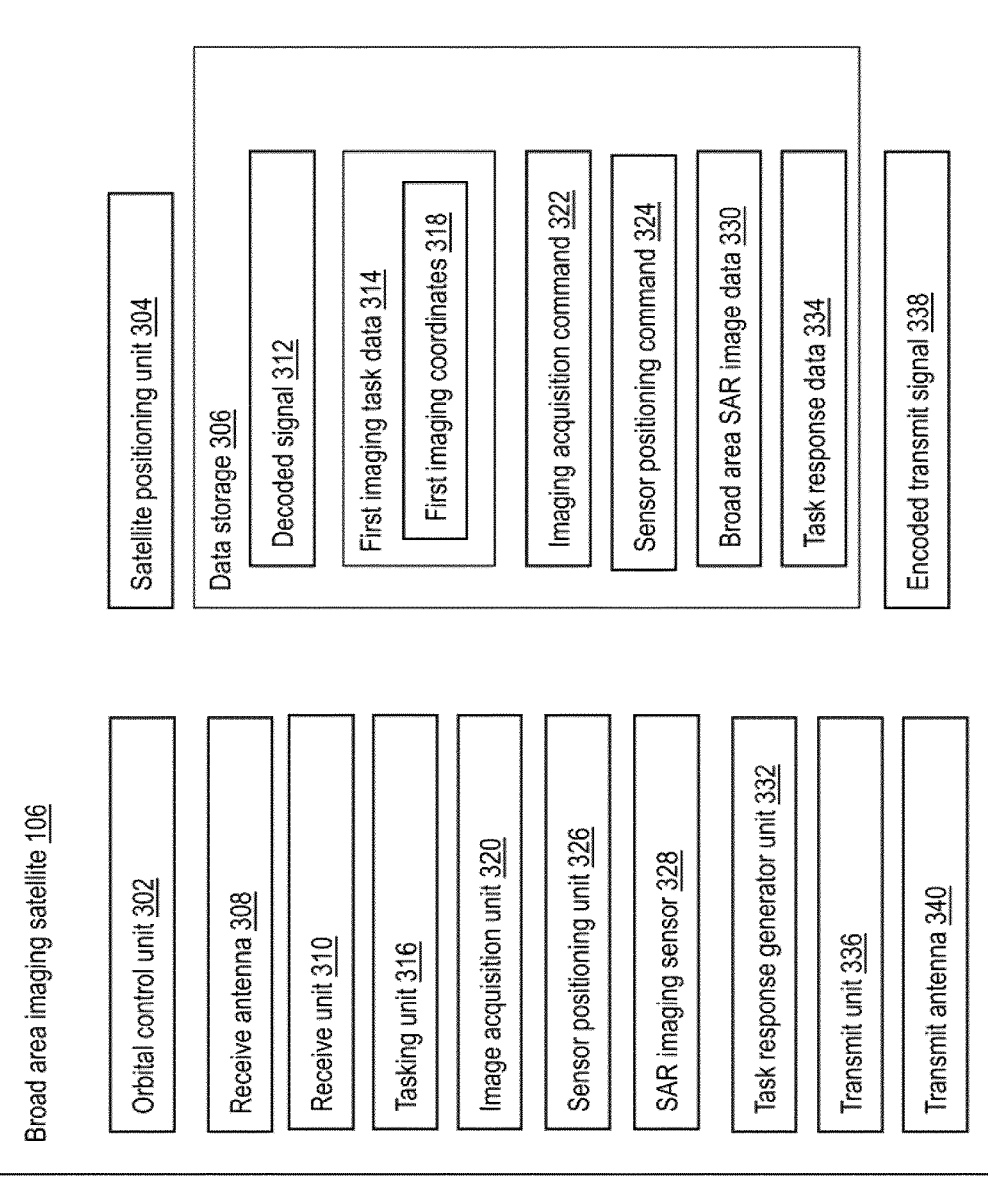
FIG. 3 is a block diagram of the broad area imaging satellite of FIG. 1, according to an embodiment.

Referring now to FIG. 3, shown therein is a block diagram 300 of the broad area imaging satellite 106 of FIG. 1, according to an embodiment. Variations of the broad imaging satellite 106 may include additional or fewer components.

The satellite 106 includes an orbital control unit 302 and a satellite positioning unit 304. The orbital control unit 302 in configured to maintain the satellite 106 in its predefined orbit. In some cases, orbital control data may be provided to the orbital control unit 302 from the ground terminal 114. The satellite positioning unit 304 positions or repositions (e.g. via actuators, propulsion subsystem) the satellite 106 based on an output provided by the orbital control unit 302.

In an embodiment, the orbital control unit 302 stores data indicating an inclined orbit for the satellite 106. The inclined orbit may have an orbit inclination of about 53.5 degrees. The inclined orbit may have latitude extents of approximately +/−62.5 degrees. The orbital control unit 302 maintains the satellite 106 in the inclined orbit.

The satellite 106 includes a data storage 306 for storing various forms of data generated by or provided to the satellite 106. The data storage 306 may be any suitable data storage element. The data storage 306 may include memory or other forms of data storage.

The satellite includes a receive antenna 308 for receiving an RF signal of a predetermined signal frequency band from the ground terminal 114. The received RF signal includes first imaging task data (such as the first imaging task data described in FIG. 2).

The receive antenna 308 provides the received RF signal to a receive unit 310. The receive unit 310 generates a decoded signal 312 from the received RF signal. The decoded signal 312 is stored in the data storage 306. The decoded signal 312 includes the first imaging task data 314.

The decoded signal 306 is provided to a tasking unit 316 configured to extract and determine the first imaging task data 314 from the decoded signal 306. The first imaging task data 314 is stored in data storage 306.

The tasking unit 316 processes the first imaging task data 314 to determine first imaging coordinates 318 defining a location at which to acquire SAR data. The first imaging coordinates 318 are stored in the data storage 306.

The first imaging coordinates 318 are provided to an image acquisition unit 320 configured to generate an image acquisition command 322. Generating the image acquisition command 322 may include determining a sensor positioning command 324 (e.g. if the satellite 106 is to look left or right to acquire the SAR data). The sensor positioning command 324 may be provided to a sensor positioning unit 326. The sensor positioning unit 326 is configured to direct a SAR imaging sensor 328 (e.g. SAR beam) in response to the sensor positioning command 324.

The SAR imaging sensor 328 is in communication with the image acquisition unit 320 and the sensor positioning unit 326. The SAR imaging sensor 328 receives the imaging acquisition command 322 instructing the SAR imaging sensor 328 to acquire SAR data at the first imaging coordinates 318. In response to receiving the imaging acquisition command 322, the SAR imaging sensor 328 acquires broad area SAR image data 330 at the first imaging coordinates 318. The broad area SAR image data 330 is stored in the data storage 306.

The satellite 106 includes a task response generator unit 332. The task response generator unit 332 is configured to use first imaging task data 314 and the broad area SAR image data 330 to generate task response data 334. The task response data 334 represents a response to the first imaging task that includes the broad area SAR image data 330. The task response data 334 is stored in the data storage 306.

The task response data 334 is provided to a transmit unit 336. The transmit unit 336 generates an encoded transmit signal 338. The encoded transmit signal 338 includes the task response data 334, which includes the broad area SAR image data 330.

The transmit unit 336 provides the encoded transmit signal 338 to a transmit antenna 340 for transmitting an RF signal of a predetermined signal frequency band to the ground terminal 114. The transmit antenna 340 transmits the RF signal based on the received encoded transmit signal 338.

Referring now to FIG. 4, shown therein is a block diagram 400 of the higher resolution imaging satellite 108 of FIG. 1, according to an embodiment. Variations of the higher resolution imaging satellite 108 may include additional or fewer components.

The satellite 108 includes an orbital control unit 402 and a satellite positioning unit 402. The orbital control unit 402 in configured to maintain the satellite 108 in its predefined orbit. In some cases, orbital control data may be provided to the orbital control unit 402 from the ground terminal 114. The satellite positioning unit 404 positions or repositions (e.g. via actuators, propulsion subsystem) the satellite 108 based on an output provided by the orbital control unit 402.

In an embodiment, the orbital control unit 402 stores data indicating a polar orbit for the satellite 108. In a particular embodiment, the polar orbit is a sun-synchronous orbit. The orbital control unit 402 maintains the satellite 108 in the sun-synchronous orbit.

The satellite 108 includes a data storage 406 for storing various forms of data generated by or provided to the satellite 108. The data storage 406 may be any suitable data storage element. The data storage 406 may include memory or other forms of data storage.

The satellite includes a receive antenna 408 for receiving an RF signal of a predetermined signal frequency band from the ground terminal 114. The received RF signal includes second imaging task data (such as the second imaging task data described in FIG. 2). The second imaging task data may describe a targeted imaging or targeted monitoring task in which a previously imaged subject (i.e. in the first imaging task) is being imaged a second time at a higher resolution.

The receive antenna 408 provides the received RF signal to a receive unit 410. The receive unit 410 generates a decoded signal 412 from the received RF signal. The decoded signal 412 is stored in the data storage 406. The decoded signal 412 includes the second imaging task data 414.

The decoded signal 406 is provided to a tasking unit 416 configured to extract and determine the second imaging task data 414 from the decoded signal 406. The second imaging task data 414 is stored in data storage 406.

The tasking unit 316 processes the second imaging task data 414 to determine second imaging coordinates 318 defining a location at which to acquire SAR data (or optical imaging data if the sensor is an optical sensor). The second imaging coordinates 418 are stored in the data storage 406.

The second imaging coordinates 418 are provided to an image acquisition unit 420 configured to generate an image acquisition command 422. Generating the image acquisition command 422 may include determining a sensor positioning command 424. The sensor positioning command 424 may be used to direct an image sensor of the satellite 108 to a particular location. The sensor positioning command 424 may be provided to a sensor positioning unit 426. The sensor positioning unit 426 is configured to direct a SAR imaging sensor 428 (e.g. SAR beam) in response to the sensor positioning command 424. In other embodiments, the satellite 108 may include an optical imaging sensor instead of or in addition to the SAR imaging sensor 428.

The SAR imaging sensor 428 is in communication with the image acquisition unit 420 and the sensor positioning unit 426. The SAR imaging sensor 428 receives the imaging acquisition command 428 instructing the SAR imaging sensor 428 to acquire SAR data at the second imaging coordinates 418. In response to receiving the imaging acquisition command 422, the SAR imaging sensor 428 acquires higher resolution SAR image data 430 at the second imaging coordinates 418. The higher resolution SAR image data 430 is stored in the data storage 406.

The satellite 108 includes a task response generator unit 432. The task response generator unit 432 is configured to use second imaging task data 414 and the higher resolution SAR image data 430 to generate task response data 434. The task response data 434 represents a response to the second imaging task that includes the higher resolution SAR image data 430. The task response data 434 is stored in the data storage 406.

The task response data 434 is provided to a transmit unit 436. The transmit unit 436 generates an encoded transmit signal 438. The encoded transmit signal 438 includes the task response data 434, which includes the higher resolution SAR image data 430.

The transmit unit 436 provides the encoded transmit signal 438 to a transmit antenna 440 for transmitting an RF signal of a predetermined signal frequency band to the ground terminal 114. The transmit antenna 440 transmits the RF signal based on the received encoded transmit signal 438.

Figure 5:
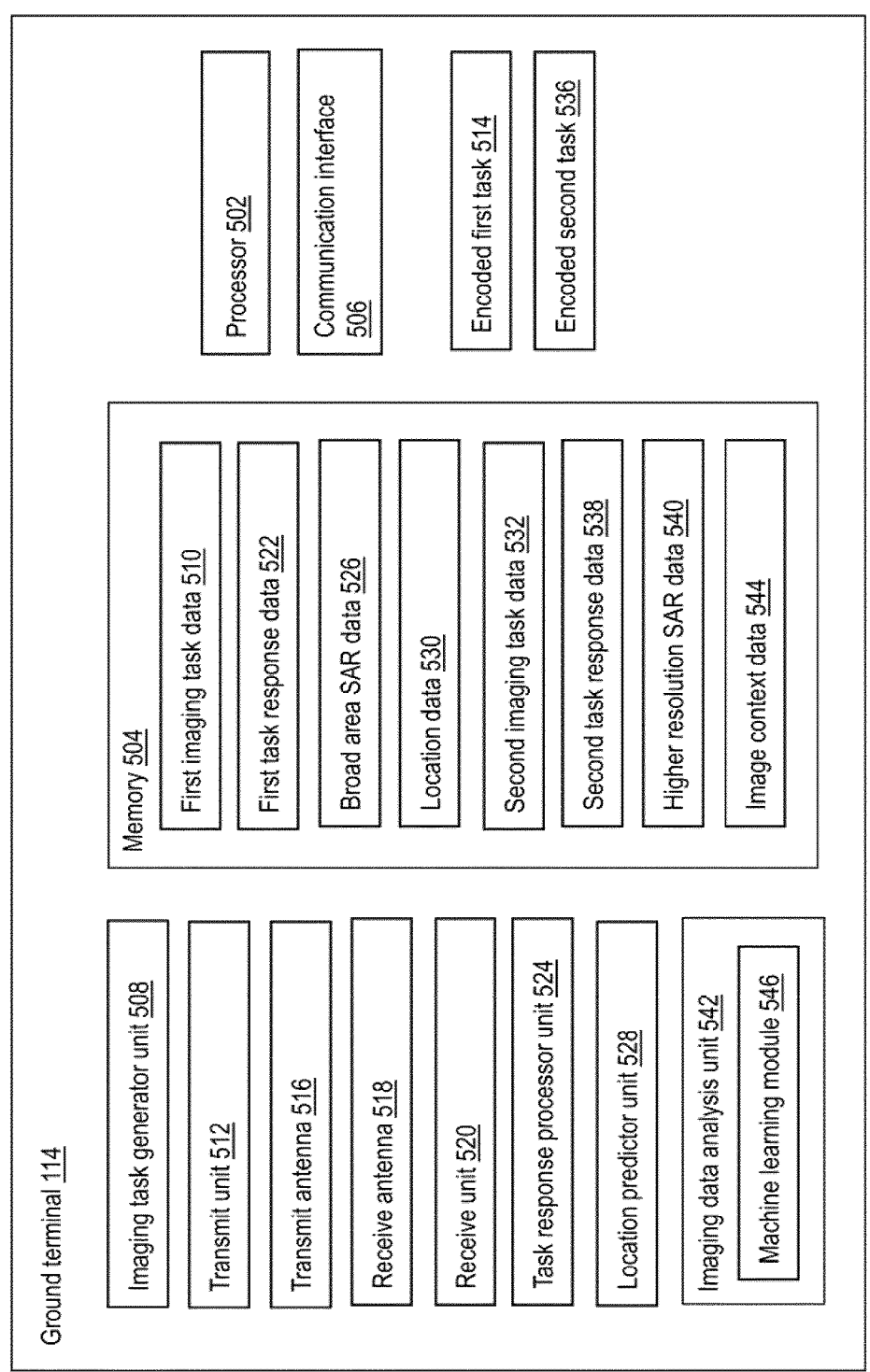
FIG. 5 is a block diagram of the ground terminal of FIG. 1, according to an embodiment.

Referring now to FIG. 5, shown therein is a block diagram 500 of the ground terminal 114 of FIG. 1, according to an embodiment. The ground terminal 114 may include one or more physical components or devices. The components illustrated and described in reference to FIG. 5 may be implemented at one or more physical devices. Certain units or modules may be implemented using software, hardware, or some combination of hardware and software. In cases where the ground terminal 114 includes multiple devices, such devices may be configured to communication with one another via wired or wireless communication connection (e.g. to provide an output of one unit or module as input to another unit or module). For example, computing devices may be communicatively connected via a network connection (wired or wireless).

The ground terminal 114 includes a processor 502 in communication with a memory 504 and a communication interface 506. The processor 502 is configured to execute computer-executable instructions embodied in one or more modules or units described in FIG. 5. The memory 504 stores various data provided to or generated by the ground terminal 114 and the computer-executable instructions executed by the processor 502. The communication interface 506 permits communication with other systems or computing devices; for example, over a local area network or wide area network (e.g. over the Internet). For example, the communication interface 506 may be used to communicate with the cloud server 126 or user terminal 124 of FIG. 1.

The ground terminal 114 includes an imaging task generator unit 508 configured to generate first imaging task data 510. The first imaging task data 510 defines a first imaging task to be performed by the broad area imaging satellite 106 and includes first imaging coordinates and instructions to acquire SAR data at the first imaging coordinates. The first imaging task data 510 is stored in memory 504.

The ground terminal 114 includes a transmit unit 512 configured to encode the first imaging task data 510 in a transmittable signal 514.

The transmit unit 512 provides the transmittable signal 514 to a transmit antenna 516. The transmit antenna 516 receives the transmittable signal 514 and is configured to generate and transmit a RF signal in a format receivable by a receive antenna of the broad area imaging satellite 106 (e.g. receive antenna 308 of FIG. 3). The RF signal is of a predetermined signal frequency band.

The ground terminal 114 includes a receive antenna 518 for receiving an RF signal of a predetermined signal frequency band from the broad area imaging satellite 106. The received RF signal represents a response to the first imaging task.

The receive antenna 518 is connected to a receive unit 520. The receive antenna 518 provides the received RF signal to the receive unit 520. The receive unit 520 decodes the received RF signal to obtain first task response data 522. The first task response data 522 is stored in memory 504. The first task response data 522 indicates it is a response to the first imaging task described in the first imaging task data 510.

The ground terminal 114 includes a task response processor unit 524. The task response processor unit 524 is configured to receive and process the first task response data 522 to obtain broad area SAR data 526. The broad area SAR data 526 is stored in memory 504.

The ground terminal 114 includes a location predictor unit 528. The location predictor unit 528 is configured to analyze the broad area SAR data 526 (and possibly other first task response data 522) to determine location data 530. The location data 530 is stored in memory 504. The location data 530 indicates a location at which to acquire additional (higher resolution) SAR data (i.e. where to point the higher resolution satellite 108). The location data 530 may include coordinates (e.g. second imaging coordinates 418 of FIG. 4). The location predictor unit 528 may be configured to determine whether a subject in the broad area SAR data 526 is stationary or in motion. When the image subject is in motion, the location predictor unit 528 is configured to predict an anticipated future location of the image subject (e.g. using a motion artifact determined for the image subject). For example, where the image subject is a marine vessel, it may be expected if the marine vessel is in motion that the marine vessel will have moved locations between imaging by the broad area satellite 106 and the higher resolution satellite 108.

The location data 530 is provided as input to the imaging task generator unit 508, which generates second imaging task data 532 which includes the location data 530 and instructions to acquire SAR data at the location defined in the location data 530. The second imaging task data 532 is stored in memory 504.

The second imaging task data 532 is provided as input to the transmit unit 512 which encodes the second imaging task data 532 into a transmittable signal 536.

The transmit unit 512 provides the transmittable signal 536 to the transmit antenna 516. The transmit antenna 516 receives the transmittable signal 536 and is configured to generate and transmit a RF signal in a format receivable by a receive antenna of the higher resolution imaging satellite 108 (e.g. receive antenna 408 of FIG. 4). The RF signal is of a predetermined signal frequency band.

The ground terminal 114 receives an RF signal from the higher resolution imaging satellite 108 encoding a response to the second imaging task 532 via the receive antenna 518.

The receive antenna 518 provides the received RF signal to the receive unit 520, which decodes the received RF signal to obtain second task response data 538. The second task response data 536 is stored in memory 504. The second task response data 536 indicates it is a response to the second imaging task described in the second imaging task data 532.

The second task response data 536 is provided to the task response processor unit 524, which processes the second task response data to obtain higher resolution SAR data 540. The higher resolution SAR data 540 is stored in memory 504.

The ground terminal 114 further includes an image data analysis unit 542. The image data analysis unit 542 is configured to analyze the higher resolution SAR data 540 to determine image context data 544. The image context data 544 describes a context for the higher resolution SAR data 540, such as an identity of an image subject (e.g. an object in the image)

The image data analysis unit 542 includes a machine learning module 546. The machine learning module 546 includes a machine learning model trained using a set of SAR training images having the same resolution as the higher resolution SAR data 540. The machine learning module 546 receives the higher resolution SAR data 540 and provides the SAR data 540 as input to the machine learning model. The machine learning model is configured to receive the higher resolution SAR data 540 as input and generate an output comprising the image context data 544. In an example, the machine learning model may be a classification model and the image context data 544 may be a class label assigned to an object in the higher resolution SAR data 540.

In other embodiments, the image data analysis unit 542 may be configured to render the higher resolution SAR data 540 in a user interface, which can be displayed at the user terminal 124. The image data analysis 542 may further configured to receive input data (e.g. image context data 544) provided by the user via the user interface.

Figure 6:
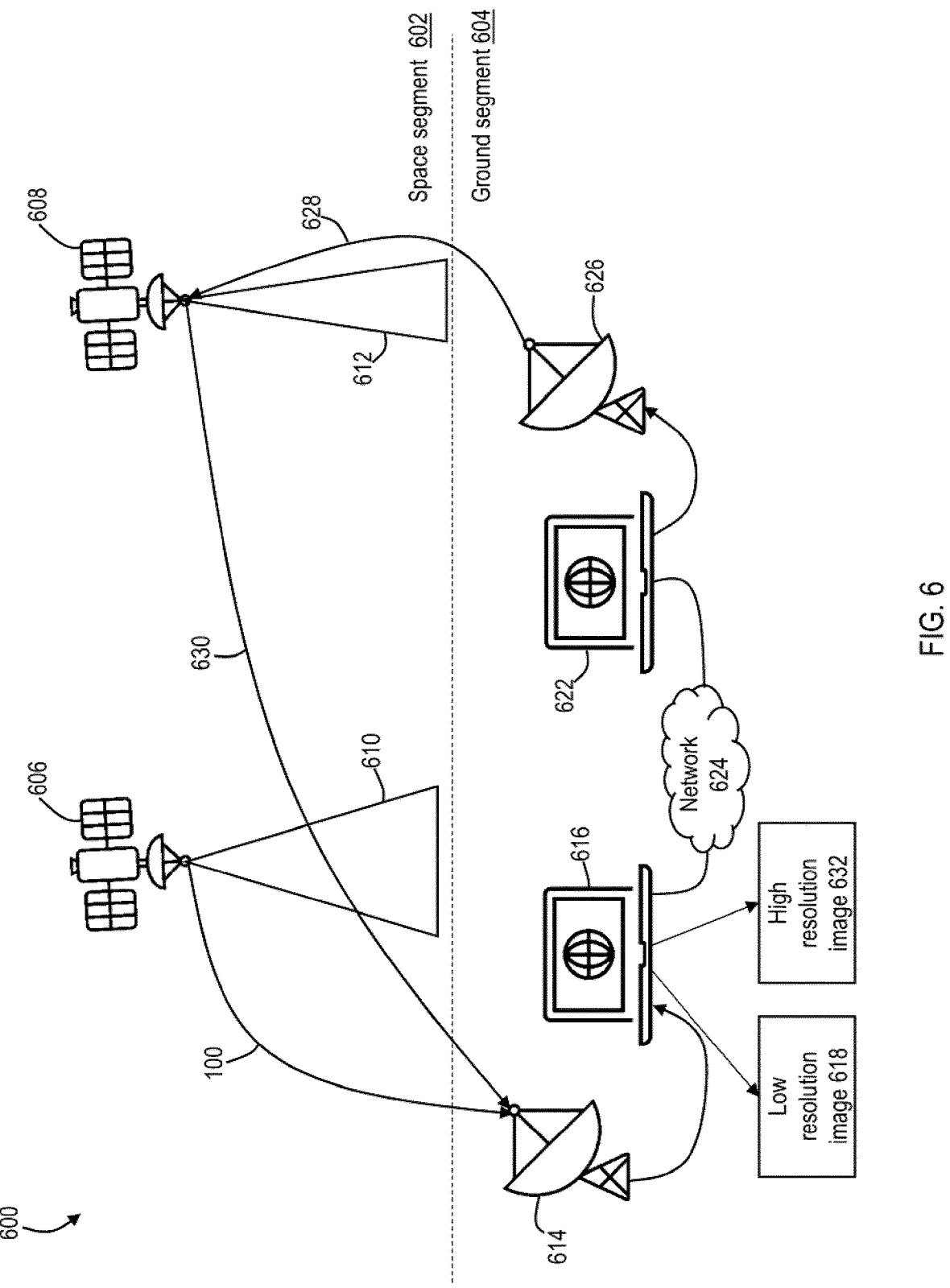
FIG. 6 is a schematic diagram of a system for performing maritime cross-cueing using a satellite constellation, according to an embodiment.

Referring now to FIG. 6, shown therein is a system 600 for performing maritime cross-cueing using a satellite constellation, according to an embodiment. The system 600 is an example implementation of the system 100 of FIG. 1.

The system 600 can perform cross-cueing operations. The cross-cueing includes the passing of detection, geolocation, and targeting information to another sensor with or without human intervention. Generally, the system 600 uses a lower resolution, broad area capability satellite and a higher resolution, narrower area capability satellite to perform cross-cueing. The broad area capability satellite is used to acquire broad area surveillance SAR data and the higher resolution, narrower area capability satellite is used to acquire high resolution, target monitoring SAR data.

In the example of FIG. 6, the cross-cueing operation includes dark ship detection. Generally, dark ship detection includes identifying vessels without an automatic identification system ("AIS") and hotspots where potential illegal activity is occurring. The system 600 may use spaceborne SAR sensors to detect non-transmitting vessels. Vessels without AIS may be considered non-transmitting dark ships. The automatic identification system (AIS) is an automatic tracking system that uses transceivers on ships and is used by vessel traffic services. Satellites can be used to detect AIS signatures, in which case the term Satellite-AIS (S-AIS) may be used. S-AIS may be used for collision avoidance, identification, and location information, as well as for maritime domain awareness, search and rescue, environmental monitoring, and maritime intelligence applications.

The system 600 includes a space segment 602 and a ground segment 604.

The space segment 602 includes a C-band SAR imaging satellite 606 ("C-band satellite") and an X-band SAR imaging satellite 608 ("X-band satellite"). The C-band satellite 606 may be the broad area satellite 106 of FIG. 1. The X-band satellite may be the higher resolution satellite 108 of FIG. 1. C-band SAR imaging satellite 606 may correspond to first satellite 1102 of FIGS. 8-9 or first satellite 1202 of FIGS. 10-11.

The C-band and X-band satellites are configured to acquire C-band SAR data and X-band SAR data, respectively, and transmit the SAR data to the ground segment 604. The X-band satellite 608 may be considered a trailing satellite with respect to the C-band satellite 606. The trail time of the X-band satellite 608 with respect to the C-band satellite 606 may be approximately 1 hour. The C-band satellite 606 is in an inclined orbit. The inclined orbit may have an orbital inclination of about 53.5 degrees. The inclined orbit may have latitude extents of +/−62.5 degrees. The X-band satellite 608 may have a sun-synchronous orbit or may have the same orbit as the C-band satellite 606 (e.g. inclined orbit).

The C-band satellite 606 has an access swath 610 that is broader than an access swath 612 of the X-band satellite 608.

The C-band and X-band satellites 606, 608 can be used to image one or more vessels (not shown) which may or may not be transmitting an AIS signature (via an AIS transmitting unit).

In the example of FIG. 6, a vessel has been identified as a non-transmitting vessel. A user of the system 600 may wish to determine whether the non-transmitting vessel is a threat, such as a pirated oil tanker.

The C-band satellite 606 may receive first imaging task data from the ground segment 604 instructing the C-band satellite 606 to acquire SAR data at first imaging coordinates based on the identification of a non-transmitting vessel. In other cases, the first image by the C-band satellite 606 may represent a broad area sweep and it may not be known what vessels are transmitting and not transmitting. The SAR image data may be downlinked to the ground segment and compared against AIS to determine vessels of interest. The X-band satellite 608 may then be tasked by the ground segment to acquire higher resolution image data at a certain location thought to include the non-transmitting vessel.

The C-band satellite 606 acquires lower resolution SAR data at the first imaging coordinates and transmits the acquired SAR data to a data exploitation system via downlink 614. The data exploitation system includes a signal receiving station 616 for receiving the signal from the C-band satellite and a data exploitation processing device 618 for processing the lower resolution SAR data to generate low resolution image 620. The processing device further processes the lower resolution SAR data to determine second imaging coordinates for a targeted imaging operation to be performed by the X-band satellite 608. The second imaging coordinates represent a predicted location of the non-transmitting vessel when the X-band satellite 608 passes over the non-transmitting vessel.

The processing device 618 is connected to a mission control processing device 622 of a mission control system via network 624.

The processing device 622 receives the second imaging coordinates and generates second imaging task data describing a second, targeted imaging task which is transmitted to a mission control transmitting station 626. The mission control transmitting station 626 transmits the second imaging task data as an RF signal to the X-band satellite 608 via uplink 628.

The X-band satellite 608 receives the RF signal and decodes the second imaging task data including the second imaging coordinates. The X-band satellite 608 acquires higher resolution SAR data at the second imaging coordinates. The X-band satellite 608 transmits the higher resolution SAR data to the receiving station 614 of the data exploitation system via downlink 630.

The RF signal carrying the higher resolution SAR data is received at the receiving station and transmitted to the processing device 616, which generates high resolution image 632. High resolution image 632 may be a SAR image having a resolution high enough that a trained operator can analyze the image 632 visually and determine its contents (e.g. determine the type or nature of the non-transmitting vessel). Accordingly, the high resolution image 632 may be provided to a user terminal (e.g. user terminal 124 of FIG. 1) which may render the high resolution in a user interface for review by the trained operator. In other cases, the high resolution image 632 may be provided to a machine learning model configured to analyze the SAR data and determine (e.g. assign a class label) whether an object in the high resolution image 632 belongs to a certain class (i.e. whether it is a threat or not).

The data exploitation system may include a plurality of receiving stations and a plurality of processing devices. In some cases, receiving stations 614 of the data exploitation system may be specially adapted to receive SAR data from either C-band satellite 606 or the X-band satellite 608. Similarly, the mission control system may include a plurality of processing devices 622 and a plurality of transmitting stations 626.

As described above, the system 600 may advantageously provide for the identification and targeted monitoring, via acquisition and analysis of SAR imaging data, of non-transmitting vessels in order to determine whether such non-transmitting vessels present a credible threat.

Figure 7:
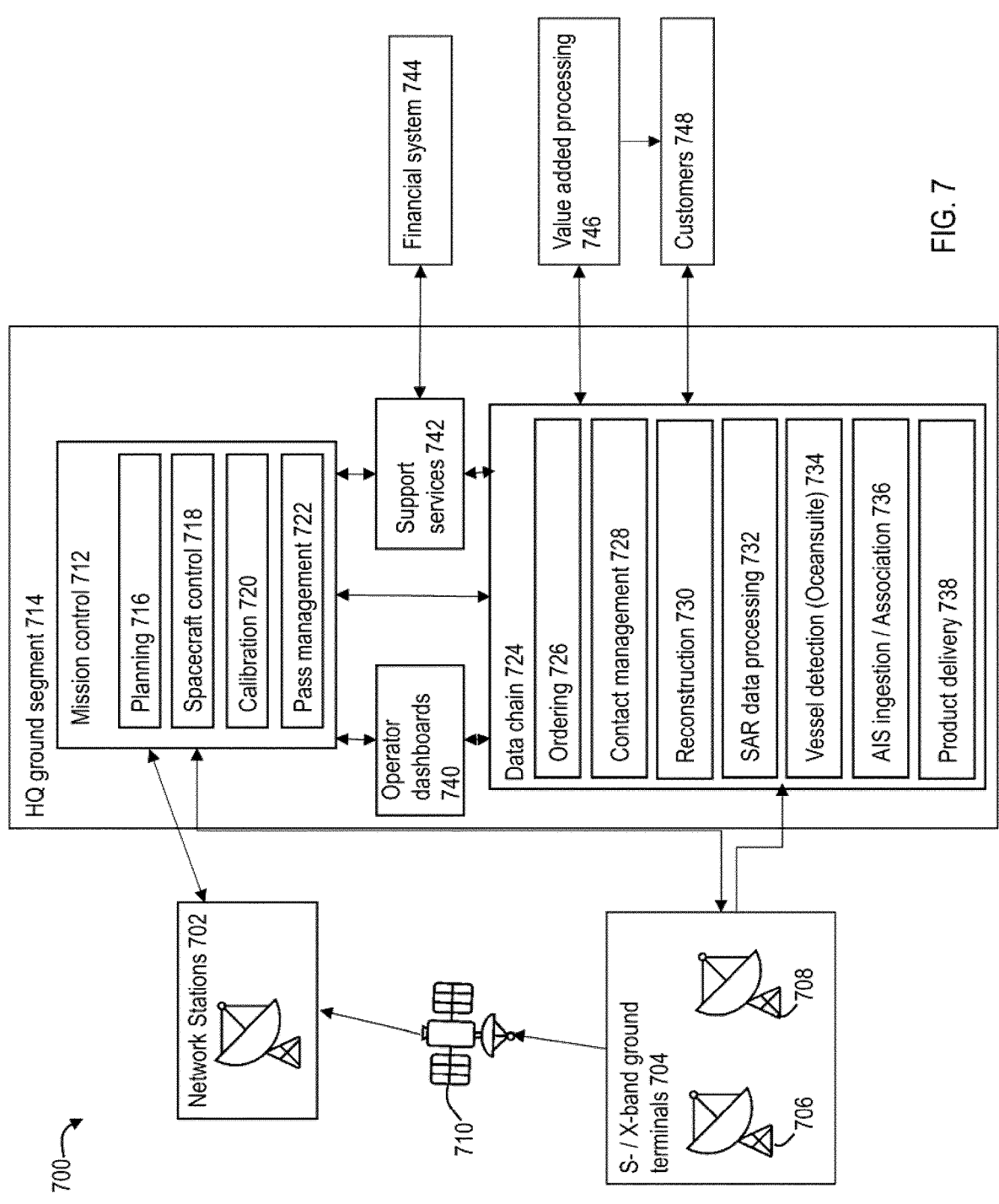
FIG. 7 is a schematic diagram of a ground segment architecture for satellite imaging, according to an embodiment.

Referring now to FIG. 7, shown therein is a ground segment architecture 700 for satellite imaging, according to an embodiment. The ground segment architecture 700 may be implemented, for example, in the ground segment 104 of FIG. 1.

The ground segment architecture 700 includes network stations 702 and S/X ground terminals 704. The S-band ground terminal is used to send commands to the spacecraft in S-band. The X-band ground terminal is used to receive SAR payload data from the spacecraft in X-band. The ground terminal (S, X) include an antenna and associated communications infrastructure. The S/X ground terminals 704 include an external S/X ground terminal 706 and an internal S/X ground terminal 708.

The network station 702 connects to a C-band SAR imaging satellite 710 via an uplink and sends mission control data from the network station 702 to the satellite 710 via the uplink. The SAR imaging satellite 710 is configured to acquire SAR image data.

The network stations 702 are communicatively connected to a mission control module 712 of an HQ ground segment 714. The SAR HQ ground segment 714, and components thereof such as the mission control module 712, may be implemented using one or more computing devices. In cases where the SAR HQ ground segment 714 includes a plurality of computing devices, the computing devices are communicatively connected via a network (such as the Internet) using wireless or wired connections.

The network stations 702 transfer data to and receive data from the mission control module 712. In doing so, the network stations 702 facilitate communication between the mission control module 712 and the satellite 710. The mission control module 712 includes a planning submodule 716, a spacecraft control submodule 718, a calibration submodule 720, and a pass management submodule 722.

The S/X ground terminals 704 connect to the satellite 710 via a downlink and receive SAR image data from the satellite 710 via the downlink.

The S/X ground terminals 704 are communicatively connected to a data chain module 724 of the SAR HQ ground segment 714. The S/X ground terminals 704 transfer SAR image data (received from the satellite 710) to the data chain module 724. The data chain module 724 includes an ordering submodule 726, a contact management submodule 728, a reconstruction submodule 730, a SAR data processing submodule 732, a vessel detection submodule 734, an AIS ingestion/association submodule 736, and a product delivery submodule 738.

The S/X ground terminals 704 are also communicatively connected to the mission control module 712 for transferring data to and receiving data from the mission control module 712.

The SAR HQ ground segment 714 also includes operator dashboards 740. The operator dashboards 740 may provide one or more user interfaces enabling a user-operator to interact with the mission control module 712 and the data chain module 724 (e.g. by inputting data to or viewing a data output thereof).

The SAR HQ ground segment 714 also includes support services 742. The support services 742 are communicatively connected to the mission control module 712 and the data chain module 724 such that the support services 742 can transfer data to and receive data from the mission control module 712 and data chain module 724.

The support services 742 are communicatively connected to a financial system 744. The support services 742 may transfer data to and receive data from the financial system 744. The support services 742 may facilitate between financial system 744 and other components of the SARHQ ground segment 714 (e.g. the data chain module 724).

The mission control module 712 and the data chain module 724 are communicatively connected for the exchange of data therebetween. In an example, the data chain module 724 may generate coordinates for an imaging task based on SAR image data acquired by the satellite 710 and provide the coordinates to the mission control module 712. The mission control module 712 may then use the coordinates to generate an imaging task including the coordinates which can be transmitted to a satellite for a subsequent imaging operation at a location based on the coordinates.

The data chain module 724 is also communicatively connected to a value-added processing module 746. The value-added processing module 746 receives data from the data chain module 724. The value-added processing module 746 processes the received data and provides the processed data to customers 748. Customers 748 may also transmit data to and receive data directly from the data chain module 724. Customers 748 may interact with the value-added processing module 746 and the data chain module 724 via a user interface configured to receive input data from the customer-user and present data outputted by the modules 724, 746.

Additional embodiments related to satellite-based observation and surveillance in which image data captured by a satellite is processed onboard the satellite will now be described in further detail with reference to FIGS. 8-17. The systems, methods, and concepts related to the embodiments of FIGS. 8-17 may be used, in whole or in part, within the systems, methods, and concepts described above in reference to FIGS. 1-7. Likewise, the systems, methods, and concepts related to the embodiment of FIGS. 1-7 may be used, in whole or in part, within the systems, methods, and concepts described in reference to FIGS. 8-17. For example, satellite onboard data processing functionalities described in FIGS. 8-17 may be implemented on satellite 106 or satellite 108 of FIG. 1.

The embodiments described below may have various applications. The systems and methods may be used to detect objects in satellite image data. The objects may be moving or non-moving. Moving objects may include vehicles (e.g. land-based, marine, spacecraft) or other moving targets. The systems and methods may be used in applications such as marine vessel detection (e.g. dark vessel detection), space traffic management, and land-based tracking operations (e.g. vehicle convoys, port activity monitoring, railroad monitoring). As such, the systems and methods may acquire and process image data of any one or more of a marine environment, land-based environment, or a space environment. The systems and methods described below may enable direct downlink of lower bandwidth products in theatre.

Onboard data processing of satellite imaging data, such as SAR data, may advantageously allow for prioritization of data for limited downlink scenarios. Embodiments implementing the onboard data processing on a reprogrammable processor such as an FPGA may enable on-orbit updates to image processing algorithms (e.g. SAR processing algorithms) or modules, which can be particularly advantageous. Generally, the onboarding data processing of satellite imaging data described herein produces a smaller data size, which can result in a smaller link to ground, more opportunities to downlink products, and less latency from time of image to time of product being in the possession of end users who need the product.

Figure 8:
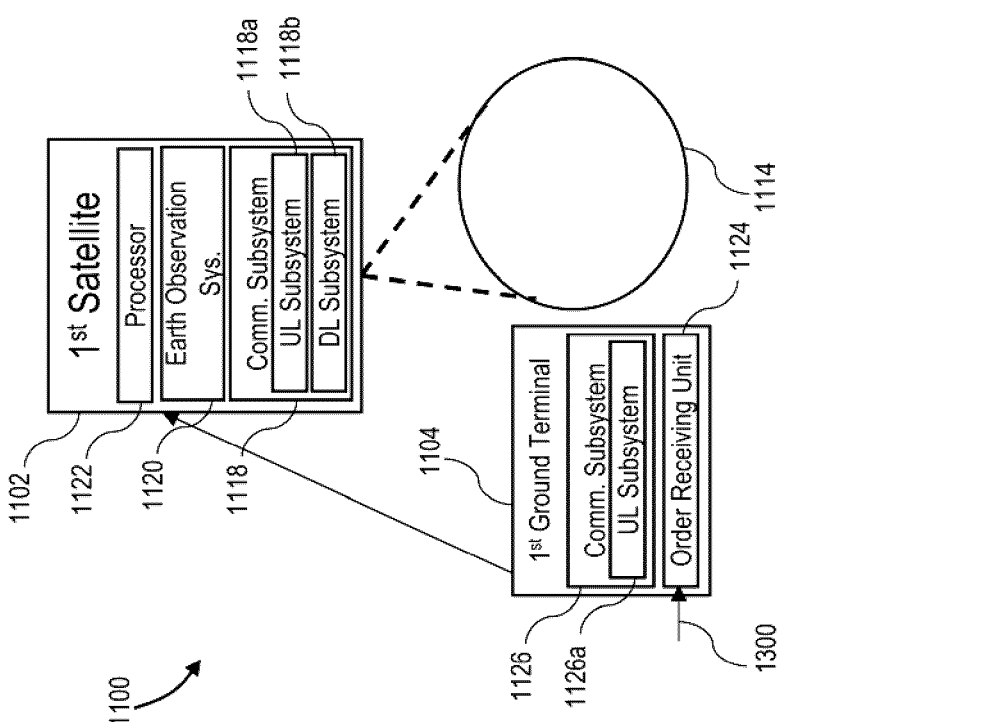
FIG. 8 is a block diagram of a system for earth observation with onboard processing, according to an embodiment.

Referring first to FIG. 8, pictured therein is a block diagram of a system 100 for earth observation, according to an embodiment.

System 1100 includes a first satellite 1102 and a first ground terminal 1104. The first satellite 1102 may be any satellite type known in the art that may support an earth observation payload. In the embodiment of system 1100, satellite 1102 refers to a physical satellite. In other embodiments, satellite 1102 may be a sub-component of a satellite, another spacecraft, or an aircraft. In the embodiment of system 1100, first satellite 1102 is in low earth orbit (LEO).

First satellite 1102 includes a communications subsystem 1118, an earth observation system 1120, and a processor 1122. The communications subsystem 1118 comprises an uplink (UL) subsystem 1118a, and a downlink (DL) subsystem 1118b. First satellite 1102 may correspond to satellite 606 of FIG. 6.

The uplink subsystem 1118a is configured to receive an order 1300 from the first ground terminal 1104. The uplink subsystem 1118a in the embodiment of FIG. 8 comprises an S-Band RF communication receiver. In other embodiments, the uplink subsystem 1118a may comprise any other component known in the art for receiving communications at a satellite from a ground terminal, including other RF bands.

The downlink subsystem 1118*b* is configured to transmit a processed product to another external terminal. The downlink subsystem 1118*b* in the embodiment of FIG. 8 comprises an S-Band RF communication transmitter. In other embodiments, the downlink subsystem 1118*b* may comprise any other component known in the art for transmitting date from a satellite to a ground terminal or another satellite, including other RF bands.

The earth observation system 1120 comprises a synthetic aperture radar (SAR) unit. The synthetic aperture radar (SAR) unit may be operated to acquire SAR data of the surface of the earth (or other celestial body, as the case may be in other embodiments), as directed by the order. In other examples of system 1100, the earth observation system may comprise any earth observation system known in the art for imaging and or surveilling the surface of the earth. Examples of other earth observation systems may include visible light observation systems, infrared observation systems and other radar-based observation systems. In some examples, earth observation system 1120 may capture C-band radar data.

The processor 1122 may be any processor suitable for use on an on-orbit satellite and which can perform processing tasks as described herein. The processor 1122 may comprise a field programmable gate array based earth observation data processor. The processor 1122 is configured to communicate with, and pass data to and from the earth observation system 1120 and communication subsystem 1118. In some examples, processor 1122 may comprise multiple sub processors, one of which may be used to conduct on-board processing of earth observation data. In some examples, processor 1122 may include a processor and memory. In some examples, processor 1122 may comprise a field programmable gate array (FPGA) based processor. In some examples, processor 1122 may comprise a Xilinx XQRKU060 FPGA. In some examples, processor 1122 may include NOR flash for the storage of FPGA configuration programming.

First ground terminal 1104 includes a communications subsystem 1126, and an order receiving unit 1124. The communications subsystem 1126 includes an uplink subsystem 1126*a*.

Order receiving unit 1124 is configured to receive an order from an external terminal or inputted to the first ground terminal by an operator through a human input device, such as a keyboard, mouse or touchscreen.

The uplink subsystem 1126*a* is configured to transmit the order 1300 to the first satellite 1102. The uplink subsystem 1126*a* in the embodiment of FIG. 8 comprises an S-Band RF communication transmitter. In other embodiments, the uplink subsystem 1126*a* may comprise any other component known in the art for transmitting communications to a satellite from a ground terminal, including other RF bands.

During the operation of system 1100, the first ground terminal 1104 receives an order 1300 at its order receiving unit 1124. The order 1300 may be provided to the order receiving unit 1124 by an external terminal, or input into first ground terminal 1104 by a human input device, such as a keyboard, mouse, or touchscreen. In some cases, the order 1300 may be input through a graphical user interface executing on the first ground terminal 1104 or on an external terminal from which the first ground terminal 1104 may be receiving the order 1300. In this way, an order 1300 may be submitted to the first ground terminal 1104 either through the first ground terminal 1104 or an external terminal communicatively connected to the first ground terminal 1104 (e.g. via a network, such as a LAN or WAN).

Figure 12:
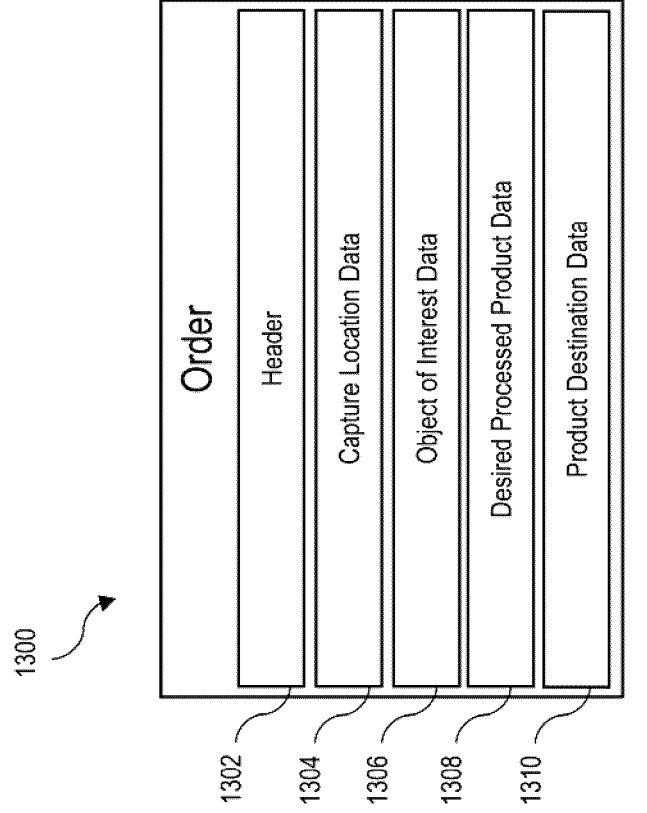
FIG. 12 is a block diagram of an order for use with a system for earth observation with onboard processing, according to an embodiment.

Referring now to FIG. 12, pictured therein is a block diagram depicting the structure of an order 1300, according to an embodiment.

The order 1300 may include a header 1302, capture location data 1304, object of interest data 1306, desired processed product data 1308, and product destination data 1310.

Header 1302 may include administrative data, identifying data, such as the operator who generated the order 1300, timestamp data, and other administrative data which may provide logistical functionality.

Capture location data 1304 may include data defining a location and or area of the earth's surface for earth observation, such as coordinate data. For example, capture location data 1304 may include the coordinate of a center point of an earth observation area. In other examples, capture location data 1304 may include a parametric description of an earth observation area, for example, a center point, and radius, describing a circular area.

Object of interest data 1306 specifies an object of interest that is to be subject of the capture data processing and analysis. The object of interest may include a certain type or class of object which an individual associated with system 1100 may be interested in. The object of interest may include a class of objects which a user of the system 1100 wishes to detect the presence of in image data. For example, the object of interest data 1306 may specify ships, motor vehicles, military equipment, weapon installations, oil spills, buildings, or other fixed structures. Generally, an object of interest may be considered anything that the processor 1122 of the first satellite is configured to detect or identify in capture data. The object of interest data 1306 can thus be used by the processor 1122 to perform an appropriate object detection or capture data analysis task. For example, different capture data analysis techniques and processing pipelines may be used for different objects of interest.

Desired processed product data 1308 specifies a desired processed product to be generated by the processor 1122 of the first satellite 1102. The desired processed product may include a number of possible processed products, including a list of detected objects of interest, an object of interest location, an object of interest characterization, an object of interest classification, an object of interest velocity, and object of interest image chips. Desired processed product 1308 may specify all possible products, or a subset of possible products that can be generated by the processor 1122.

Product destination data 1310 specifies a destination terminal or device for the processed product specified in the desired processed product data 1308. The product destination data 1310 may include a final destination for processed products. For example, when system 1100 is employed in a maritime surveillance context, the product destination data 1310 may include a specific maritime vessel used to respond to unknown detected vessels within the observation area.

In some examples, order 1300 may include only a subset of the subcomponents detailed in FIG. 12.

In some examples, order 1300 may be received or input into the first ground terminal 1104 in the final desired format, as described above in reference to FIG. 12. In other examples, order 1300 may be processed by the first ground terminal 1104 to convert order 1300 into a format readable by first satellite 1102.

In some examples, a ground terminal 1104 may communicate with a plurality of prospective first satellites. Each first satellite may be configured to observe a certain portion of the earth's surface. The ground terminal 1104 may determine which first satellite to transmit the order 1300 to depending on the capture location data 1304 in the order. For example, the ground terminal 1104 may further comprise a database of possible first satellites, and associated observation ranges of all first satellites. The ground terminal 1104 may determine which first satellites are within range. The ground terminal 1104 may then deliver the order 1300 to a first satellite within imaging range.

In other examples, the header 1302 may include first satellite data, such that the ground terminal 1104 may determine desired first satellite by parsing header 1302 data, wherein a destination first satellite is encoded.

Referring again to FIG. 8, first ground terminal 1104 may transmit the order 1300 to first satellite 1102. First satellite 1102 may receive the order 1300 transmitted from the first ground terminal 1104 using the uplink subsystem 1118*a*. The order 1300 may be passed to the processor 1122, which may parse the order 1300 and pass the order 1300 or some subset thereof to the earth observation system 1120.

The earth observation system 1120 may be operated to acquire earth observation data, of an area of the earth's surface 1114 as directed by capture location data 1304. In other embodiments, such as those relating to space traffic management, the earth observation system 1120 may be directed to capture an area of space (rather than of the earth's surface), In some examples, first satellite 1102 may further comprise a propulsion system and an attitude control system. The propulsion system may be operated to change the orbit parameters to position first satellite 1102 such that the first satellite 1102 is in a position such that earth observation system 1120 may acquire earth observation data as directed by capture location data 1304. The attitude control system may be operated to orient or change where the spacecraft is pointing. Once satellite 1102 is in the correct position and orientation, earth observation system 1120 may acquire earth observation data.

Earth observation data may be passed to processor 1122 for the generation of a processed product 1400.

Figure 13:
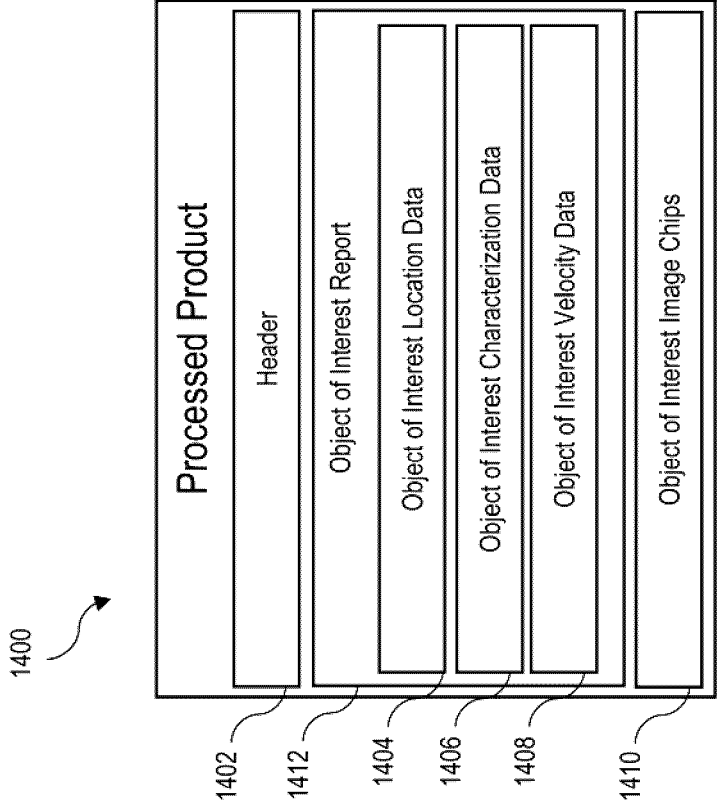
FIG. 13 is a block diagram of a processed product generated by a system for earth observation with onboard processing, according to an embodiment.

Referring now to FIG. 13, pictured therein is a block diagram depicting components of a processed product 1400, according to an embodiment. The processed product 1400 may comprise a header 1402, an object of interest report 1412, and object of interest image chips 1410. The object of interest report 1412 may include any one or more of object of interest location data 1404, object characterization data 1406, and object of interest velocity data 1408 (e.g. in the case of moving object or target detection). Systems and methods described herein may be used to detect, locate and characterize objects captured by an earth observation system. In the context of object detection onboard processing, characterization may mean description of physical characteristics of a detected object, for example object length, width, surface area, etc.

Header 1402 may comprise administrative data, identifying data, such as the operator who generated the order 1300, timestamp data, first satellite data, and other administrative data which may provide logistical functionality.

Object of interest report 1412 may include object of interest location data 1404, object characterization data 1406, and object of interest velocity data 1408. In some cases, the object of interest report 1412 may include the object of interest image chips 1410 (e.g. with object of interest image chips 1410 associated with data in the object of interest report 1412 describing the object of interest captured in the image chip). Object of interest report 1412 may also include administrative data, such as timestamp data, first satellite data, and other administrative data which may provide logistical functionality.

Object of interest location data 1404 may comprise an output of the location of all detected objects of interest. Object of interest location data 1404 may, for example, specify coordinates defining a location for one or more detected objects. The object of interest location data 1404 may include a listing of the coordinates of the geometric center point of all located objects of interest.

Object characterization data 1406 may include a qualitative or quantitative characterization of each object of interest. The object characterization data may describe one or more physical characteristics of the object (e.g. vessel), such as, for example object length, object width, object surface area, etc. For example, if the object of interest 1306 specified by the order is marine vessels, object characterization 1406 may comprise an output characterizing each located object of interest into distinct, predetermined classes. For example, if the system described herein is used for marine surveillance, the objects of interest may be marine vessels. Object characterization 1406 output in such an example may comprise qualitative characterizations of each located object of interest, such as "aircraft carrier", "submarine" or "cruiser". In some cases, the object characterization data 1406 may include an object classification (e.g. a class assignment or label), specifying a class of object to which the object of interest belongs, determined via an object detection or object classification task performed by the processor 1122.

Object of interest velocity data 1408 may include an output of a velocity of each detected object of interest. The output may be a numerical speed and direction of motion of each detected object of interest.

Object of interest image chips 1410 may comprise image crops of each detected object of interest. Image chips 1410 may provide value to end users of the system, as each located object of interest may be quickly manually verified through visual inspection. An operator may examine an image chip of a detected object of interest to confirm that the processor 1122 correctly identified the object of interest. Additionally, an operator may examine an image chip of a detected object of interest to extract information that may not be captured when characterizing objects. For example, an object may be classified as a large ship via the object of interest characterization data 1406. An operator may visually inspect the corresponding image chip to identify whether the ship is a military or civilian vessel.

In some cases, object of interest image chips 1410 may be used as input to an object of interest classification module implementing one or more classification algorithms for classifying the object of interest in the image chip 1410. The object of interest classification algorithm may be any suitable classification algorithm. For example, the object of interest classification module may implement a machine learning-based classification model or algorithm. The object of interest classification module may be implemented on a processing unit of a ground-based terminal (e.g. ground terminal 1210, ground terminal 1212), in which case the image chip 1410 may be received by downlink from the first satellite 1202 and processed via the classification module to determine a class assignment for the object of interest. Classification data may then be displayed or further communicated to other terminals (e.g. as part of processed product 1400). In other embodiments, the object of interest classification module may be implemented on the processor of the first satellite (e.g. processor 1122, 1222). The classification module may process the image chip 1410 via the classification module to determine a class assignment for the object of interest. The classification data may then be communicated to another terminal, such as a ground terminal or second satellite (e.g. second satellite 1106), for example as part of processed product 1400 (e.g. within object of interest report).

Referring again to FIG. 8, processor 1122 may process earth observation data, as directed by order 1300. Processor 1122 may parse object of interest 1306 and desired processed product 1308 of order 1300 to determine what information is to be identified and processed, and what outputs are to be generated. Processor 1122 may output a processed product 1400. Processed product 1400 may be transmitted to another terminal for further use.

Figure 9:
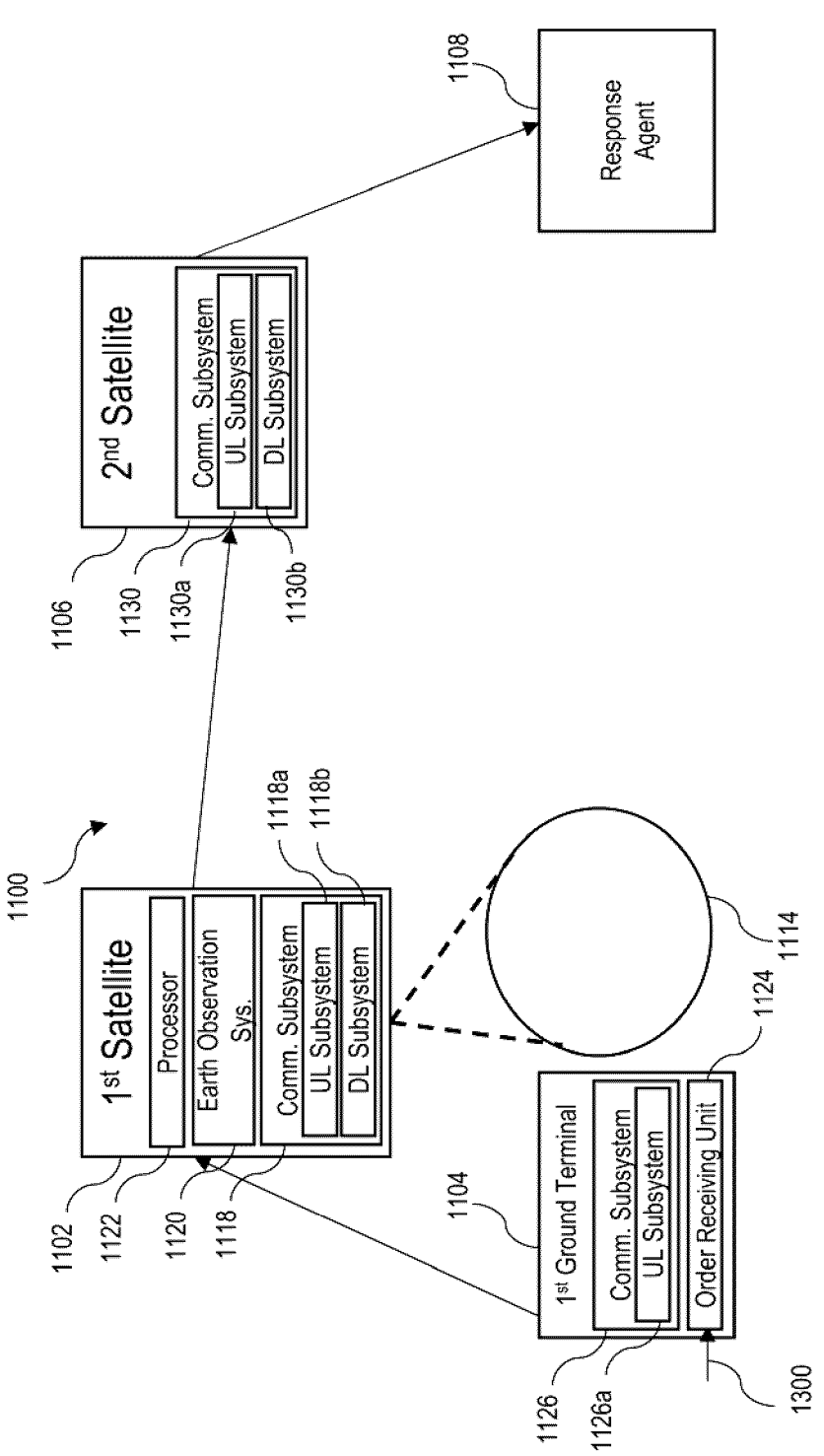
FIG. 9 is a block diagram of a system for earth observation with onboard processing, according to another embodiment.

Referring now to FIG. 9, pictured therein is an embodiment of system 1100 as described above in reference to FIG. 8, further comprising a second satellite 1106 and a response agent 1108. The system 1100 of FIG. 9 includes intersatellite communication of processed product 1400 that is generated onboard the first satellite 1102 via the processor 1122.

Second satellite 1106 includes a communication subsystem 1130, including an uplink subsystem 1130a and downlink subsystem 1130b. Second satellite 1106 may be configured as a relay satellite, wherein the second satellite 1106 is configured to receive a signal from one satellite and transmit the same signal (i.e. relay) to another satellite or to a ground station or terminal. The second satellite 1106 may have any suitable orbit for providing the signal relay function. In some examples, second satellite 1106 may be in a geosynchronous orbit (GEO). In some examples, second satellite 1106 may be in a low earth orbit (LEO). In a particular embodiment, the second satellite 1106 may be part of a relay network of satellites, such as a GEO satellite relay network.

Response agent 1108 may comprise any vehicle, system, or individual which may respond to an object located by the systems described herein. For example, in marine surveillance applications, response agent 1108 may comprise a marine patrol vessel. Further, response agent 1108 includes, is connected to, or has access to a receiving terminal including a communication subsystem and a computing device. The communication subsystem is configured to receive communications from the second satellite (transmitted via DL subsystem 1130b). The computing device may be configured to process the processed product in its received format into a format suitable for output. The computing device is configured to output the processed product 1400 in a human readable format. For example, the computing device may be configured to execute a graphical user interface module for displaying the processed product or elements thereof in human readable format.

In the system 1100 of FIG. 9, first satellite 1102 transmits processed product 1400 to second satellite 1106 using its downlink subsystem 1118b. Second satellite 1106 receives the processed product 1400 via uplink subsystem 1130a. In system 1100 of FIG. 9, downlink subsystem 1118b may comprise an intersatellite link configured to communicate with another orbiting satellite, and uplink subsystem 1130a may be configured to receive communications from another orbiting satellite. The intersatellite link may be implemented separately from an uplink/downlink subsystem used to communicate with a ground station.

Second satellite 1106 may transmit the processed product 1400 to response agent 1108 using downlink subsystem 1130b. Second satellite 1106 may use the product destination data 1310 of order 1300 to determine where (i.e. to which response agent 1108) to transmit the processed product 1400.

Response agent 1108 may receive processed product 1400 via its receiving terminal. Response agent 1108 may proceed to respond to detected objects of interest that are of particular concern. This may include objects which present safety or security risks.

Figure 10:
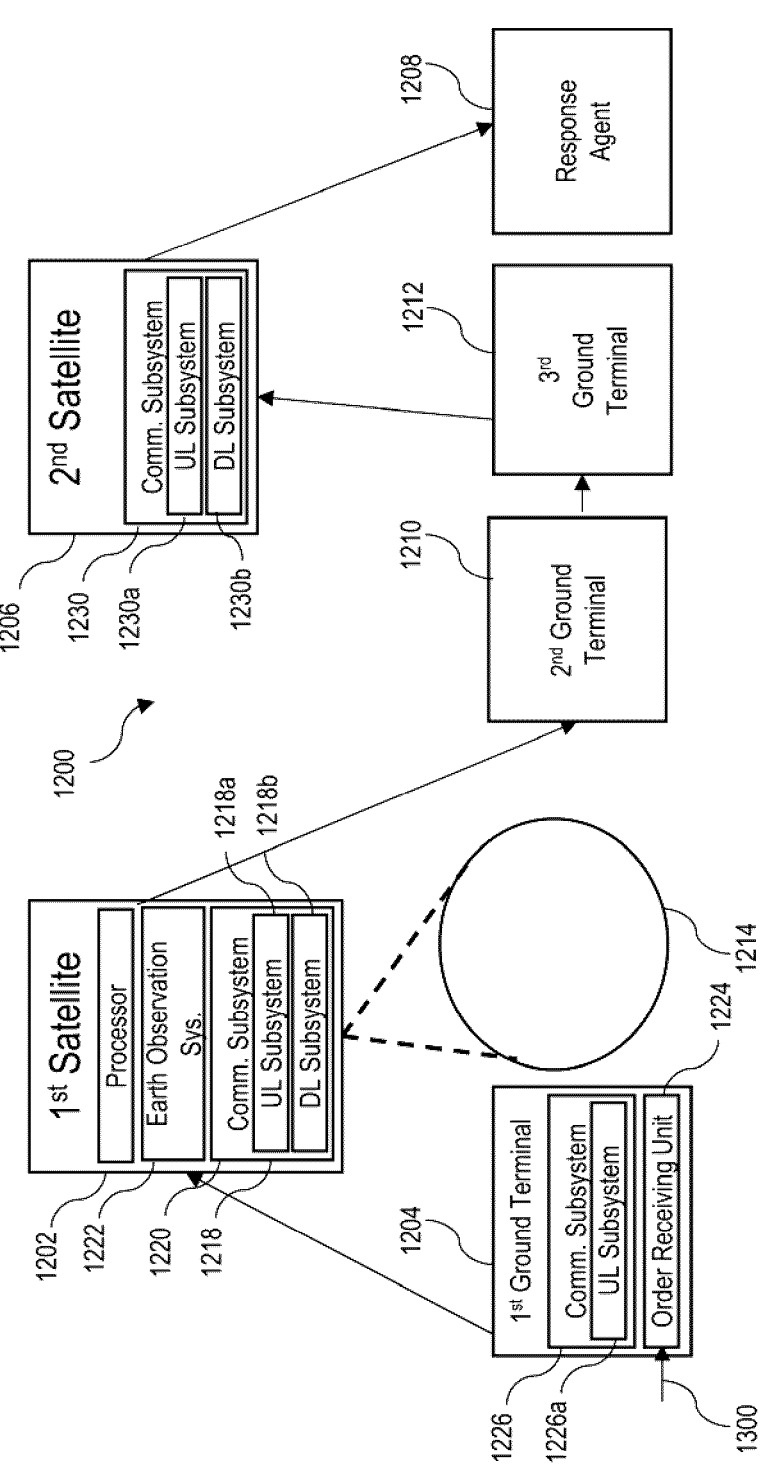
FIG. 10 is a block diagram of a system for earth observation with onboard processing, according to another embodiment.

Referring now to FIG. 10, pictured therein is a system 1200 for earth observation with onboard processing, according to an embodiment. Description above in reference to system 1100 applies to system 1200. System 1200 comprises all components of system 1100 and further comprises second ground terminal 1210 and third ground terminal 1212. In some cases, second and third ground terminals 1210, 1212 may be the same ground terminal.

In the operation of system 1200, first satellite 1202 may transmit processed product 1400 to second ground terminal 1210 via the downlink subsystem 1218b. Second ground terminal may receive processed product 1400 via a downlink subsystem and transmit processed product 1400 to third ground terminal 1212 via a communication interface (e.g. network interface, where the second and third ground terminals are communicatively connected via a network connection, such as a LAN or WAN). Third ground terminal may receive processed product 1400 via a communication interface and transmit processed product 1400 to second satellite 1206. Second satellite 1206 may transmit processed product 1400 to response agent 1208. Response agent 1208 may utilize information contained within processed product 1400 to conduct an operation.

The first satellite 1102 to second satellite 1106 communication link of system 1100 may require line of sight between the first satellite 1102 and second satellite 1106. System 1200 may advantageously allow for communication wherein the first satellite 1202 and second satellite 1206 are not within line of sight. Additionally, inter-satellite communication may require an additional or specialized intersatellite communication subsystem. In examples wherein the second satellite 1206 is in geosynchronous orbit, line of sight between first satellite 1102 and second satellite 1106 will generally be available. Thus, embodiments including relay from the first satellite 1102 through one or more ground terminals to the second satellite 1106 and then to the response agent (end user) may be particularly advantageous.

Figure 11:
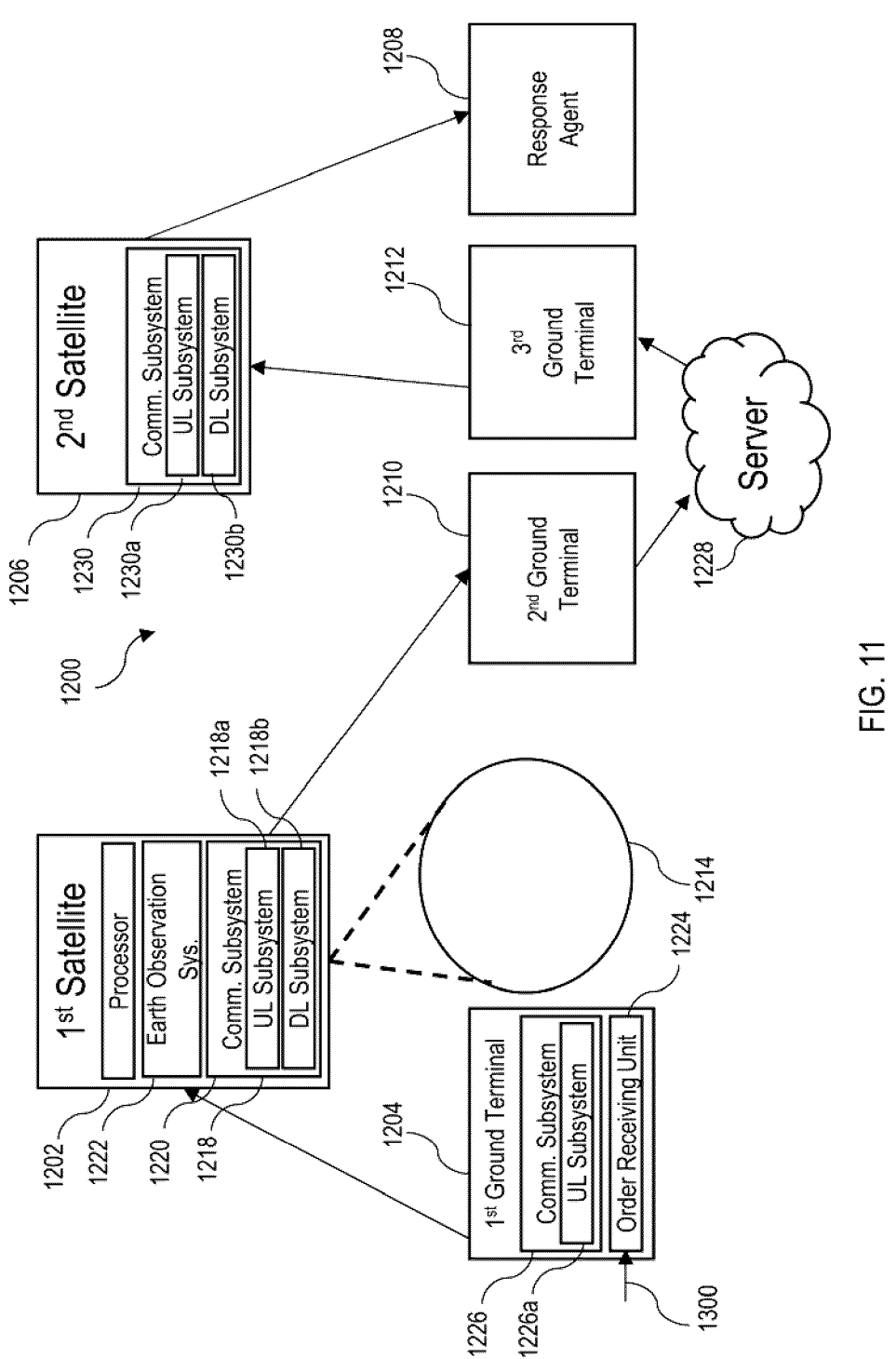
FIG. 11 is a block diagram of a system for earth observation with onboard processing, according to another embodiment.

Referring now to FIG. 11, pictured therein is a further embodiment of the system 1200 of FIG. 10. The system 1200 of FIG. 11 further comprises cloud server 1228. Second ground terminal 1210 is configured to communicate with third ground terminal 1212 through cloud server 1228. Cloud server 1228 may be any server type known in the art that allows for transmitting communications between two terminals.

Passing processed product 1400 through cloud server 1226 when transmitting the processed product 1400 from the second ground terminal 1210 to third ground terminal 1212 may provide further functionality. For example, the presence of cloud server 1228 in the communication chain may enable cloud server 1228 to further process processed product 1400 during transmission. For example, the cloud server 1228 may store correlation data that can be used by the cloud server 1228 to further verify detected objects identified in the processed product 1400. In an example, the correlation data may identify or describe objects that are not of interest or of concern and which may not warrant a response or treatment as a detected object, and the data describing detected objects in the processed product 1400 may be compared to the correlation data to identify "matches". The matches may then be communicated as part of the processed product 1400 or along with the processed product 1400, for example as an annotation to the processed product 1400 (e.g. flagging or labelling detected objects that have matches in the correlation data). Similarly, detected objects without "matches" in the correlation data may be flagged or labelled. In other cases, the cloud server 1228 may be configured to alter the processed product 1400, such as by removing detected objects that have matches in the correlation data.

In examples wherein the systems described herein are used in maritime surveillance applications, cloud server 1228 may enable dark target correlation with automatic identification system (AIS) functionality. The cloud server 1228 may be a third party AIS data provider. Within a given earth observation area, there may exist a number of marine vessels. Cloud server 1228 may comprise an AIS database including all current known transmitting ships, as detected by AIS. Vessels that are not present within the database may be termed "dark ships" or "dark targets". Cloud server 1228 may reference the AIS database to determine whether any located marine vessels are not present within the AIS database, and label non-present vessels as dark targets. Dark targets may comprise high priority detected vessels, as dark targets may present greater security risks. Response agent 1208 may respond to dark targets at a higher priority or may only respond to dark targets. In other cases, the cloud server 1228 may simply feed AIS data (which AIS data may be determined by the contents of the processed product 1400, such as location data) to the third ground terminal 1212. The cloud server 1228 may receive AIS data from a global constellation of satellites dedicated to AIS and may provide the system 1200 with ship track historical data that can be used for correlation with the processed product 1400.

In other examples of the systems described herein, dark target correlation may be performed without a cloud server, and instead may be performed by any one of the first ground terminal 1104, 1204, first satellite 1102, 1202 or second satellite 1106, 1206. In cases where such dark target correlation is performed by satellite, the performing satellite may include an AIS payload for performing ship tracking. In cases where such dark target correlation is performed by satellite, the dark target correlation may be performed by onboard processor 1122, 1222. Similarly, in other embodiments directed to forms of data correlation other than AIS for dark target correlation in which data correlation is performed by the satellite, the onboard processor 1122, 1222 may be configured to perform the data correlation.

Figure 14:
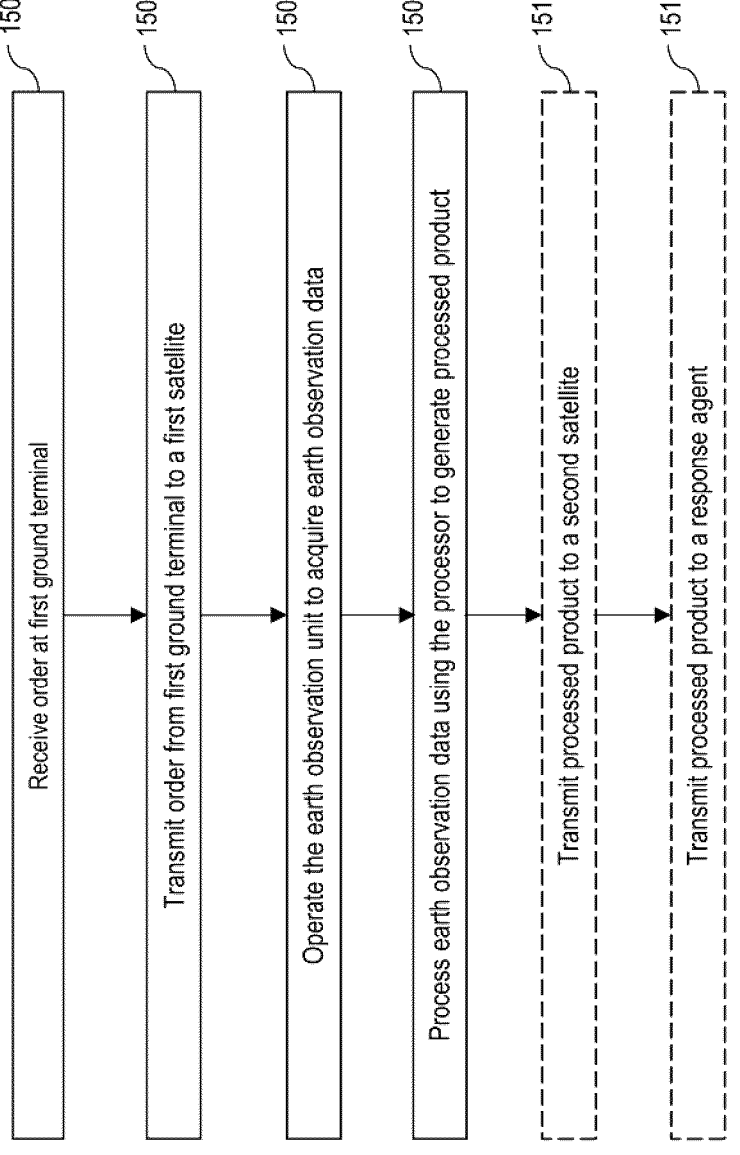
FIG. 14 is a flowchart of a method of earth observation with onboard processing, according to an embodiment.

Referring now to FIG. 14, pictured therein is a flow chart detailing a method 1500 of earth observation with onboard processing, according to an embodiment. Method 1500 includes steps 1502, 1504, 1506, 1508, and optionally 1510, and 1512. Description above in reference to FIGS. 8-13 applies to method 1500.

At 1502, an order, such as order 1300, is received at a first ground station. The order specifies an earth observation task.

At 1504, the order is transmitted from the first ground terminal to a first satellite.

At 1506, the earth observation unit is operated to acquire earth observation data. The acquisition of earth observation data is based on the order.

At 1508, the earth observation data is processed to generate a processed product, such as processed product 1400.

At 1510, the processed product is transmitted to a second satellite. The processed product may be transmitted to the second satellite via an intersatellite link.

At 1512, the processed product is transmitted to a response agent.

Referring now to FIG. 15, pictured therein is a flow chart detailing a method 1600 of earth observation with onboard processing, according to an embodiment. Method 1600 includes steps 1602, 1604, 1606, 1608, 1610, 1612, 1614, and 1616.

At 1602, an order, such as order 1300, is received at a first ground station. The order specifies an earth observation task.

At 1604, the order is transmitted from the first ground terminal to a first satellite.

At 1606, the earth observation unit is operated to acquire earth observation data.

At 1608, the earth observation date is processed to generate a processed product, such as processed product 1400.

At 1610, the processed product is transmitted to a second ground terminal.

At 1612, the processed product is transmitted to a third ground terminal. In some examples of method 1600, processed product may be transmitted directly from the second ground terminal to the third ground terminal. In other examples, processed product may be transmitted from the second ground terminal to the third ground terminal through a cloud server, such as cloud server 1228.

At 1614, processed product is transmitted to a second satellite.

At 1616, processed product is transmitted to a response agent.

Figure 16:
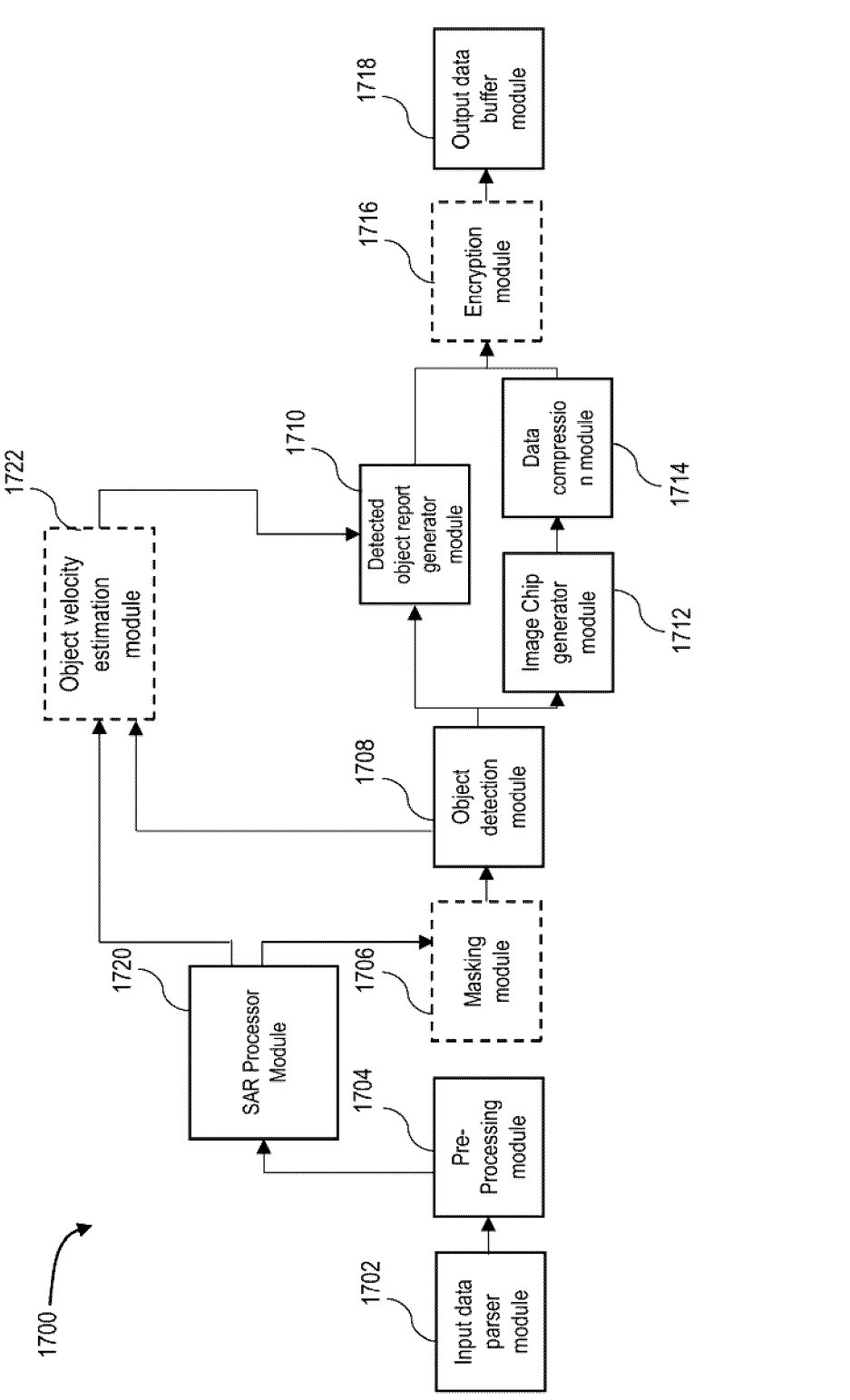
FIG. 16 is a flowchart of a processing pipeline for onboard processing of earth observation data, according to an embodiment.

Referring now to FIG. 16, pictured therein is a block diagram of a processing pipeline 1700 for performing processing of earth observation data onboard a satellite ("onboard processing"), according to an embodiment.

The processing pipeline 1700 may be implemented on a processor suitable for use on an on-orbit satellite such that, when in orbit, the processor can process earth observation data using the pipeline 1700. For example, processing pipeline 1700 may be implemented in processor 1122 of first satellite 1102 as described above. In an embodiment, the processor may be an FPGA-based processor. In such an embodiment, the processing pipeline 1700 may represent an FPGA design for the onboard processing.

Description above in reference to FIGS. 8-15 applies to pipeline 1700. While FIG. 16 references SAR data, in other embodiments the pipeline 1700 may be used, with appropriate modification, to process other forms of image data.

The processing pipeline includes a plurality of software modules including an input data parser module 1702, a pre-processing module 1704, a SAR processor module 1720, a masking module 1706, an object detection module 1708, a detected object velocity estimation module 1722, a detected object report generator module 1710, an image chip generator module 1712, a data compression module 1714, an encryption module 1716, and an output data buffer module 1718.

The input data parser module 1702 is configured to receive raw SAR data as input and parse the raw SAR data to generate parsed SAR data. The parsed SAR data is outputted to the pre-processing module 1704. The input data parser module 1702 may be configured to parse all input data, strip off headers, and initialize any necessary parameters. The output of the input data parser module 1702 may include parsed raw data without headers.

The pre-processing module 1704 is configured to receive the output of the input data parser module 1702 as input and perform pre-processing on the parsed SAR data to generate pre-processed SAR data. The pre-processed SAR data is outputted to the SAR processor module 1720. In an embodiment, the pre-processing module 1704 is configured to execute any calculations that can be done before processing starts. The input to the pre-processing module 1704 may include parsed data, as well as commands and parameters.

The output generated by the pre-processing module 1704 may include (pre-processed) data and pre-calculated parameters needed for SAR processing (e.g. by module 1720).

The SAR processor module 1720 is configured to receive the pre-processed SAR data as input and process the received input to generate an output comprising SAR imagery. The SAR processor module 1720 may be configured to process SAR imagery according to any suitable technique. The SAR processor module 1720 may be configured to receive the pre-processed SAR data as input and output processed bursts or strips of SAR imagery. The output generated by the SAR processor module 1720 is outputted to the masking module 1706 and the detected object velocity estimation module 1722. In embodiments not including a masking module 1706, the output may be provided to the object detection module 1708. In some embodiments, SAR processor module 1720 may be configured to process multi-aperture SAR data.

In an embodiment, the SAR processor module 1720 is the main module for processing raw data and creating images to be used for object detection or other modules. The output of SAR processor module 1720 may include SAR imagery (SAR image data) processed in strips or bursts. Whether the output includes SAR imagery processed in strips or bursts depends on the SAR mode.

In an embodiment, the SAR processor module 1720 may perform multi-aperture range-Doppler SAR processing with Doppler centroid estimation. The range-Doppler aspect of the SAR processing algorithm may include Spectral Analysis (SpecAn) and Fast Convolution versions. In another embodiment, the SAR processor module 1720 may implement a Back Projection (BP) SAR processing algorithm.

As noted, variations of the SAR processor module 1720 may use Doppler centroid estimation by implementing a Doppler centroid estimation algorithm. The Doppler centroid algorithm may be configured to estimate the center frequency of the Doppler spectrum of the data, related to the azimuth beam center. The Doppler centroid may be estimated at different ranges in the data and a polynomial function of range may be fitted to the measurements. The Doppler centroid may be updated in successive azimuth blocks.

The masking module 1706 is configured to receive processed SAR data as input and perform a masking operation on the processed SAR data to generate masked SAR data. The masking operation is configured to mask areas of the SAR data that are not relevant to the object detection operation and may otherwise potentially lead to false detections.

In an embodiment, the masking module 1706 may be configured to access a database comprising polygons describing areas or objects which are to be masked (e.g. ignore points). Masks stored in the database may be intended to mask or obscure certain objects or portions of an image which are known to be not of interest and thus can be obscured to reduce potential for false detections.

For example, for maritime surveillance applications, the masking module 706 may be a land masking module configured to access a database comprising polygons describing world land masses. The land mask is extracted from the database and applied to the input data. All land mass may be excluded from further processing, to prevent objects in the masked area from being detected. In other examples, other areas may be masked, for example, known secure zones wherein no surveillance is required. Masking may reduce the capture area which must be analyzed for object detection, reducing processing time and decreasing observation latency.

The masking module 1706 outputs the masked SAR data to the object detection module 1708.

The object detection module 1708 is configured to perform object detection tasks on received SAR data. This may include masked SAR data or unmasked SAR data. In an embodiment, the object detection module 1708 may be configured to detect one or more classes of objects in the SAR data and output a list of detected objects or annotated SAR image including an object class assignment and bounding box coordinates for each detected object.

In an embodiment, the object detection module 1708 may be configured to solve an optimization problem. For example, individual pixels may be detected first and then clustered together based on proximity to form object detections. The output of the object detection module 1708 may include a geographic location and one or more characteristics for each detected object.

In another embodiment, the object detection module 1708 may be configured to implement a Constant False Alarm Rate (CFAR) technique for object detection. The CFAR technique may characterize background imagery using a statistical fit to the background clutter (e.g. background sea clutter in a vessel detection embodiment of object detection) and noise with the fit being applied on a tile-by-tile basis. Different types of CFAR techniques may be used, such as K-distribution and tri-modal distribution. For this kind of object detection, any statistical distribution function may be used.

The object detection output generated by the object detection module 1708 is outputted to the detected object report generator module 1710 and the image chip generator module 1712. In embodiments including the object velocity estimation module 1722, the object detection output is provided to the object velocity estimation module 1722.

The object velocity estimation module 1722 is configured to receive outputs from the multi-aperture specAn SAR processor with doppler centroid estimation module 1720 and the object detection module 1708 and determine an estimated object velocity for one or more objects detected by the object detection module 1708. The estimated object velocity values are outputted to the detected object report generator module 1710.

In an embodiment, velocity estimation is performed based on co-registration of two images from two data receiver channels. The input to the velocity estimation module 1722 is processed SAR image for each channel and the output is estimation of radial velocity for each detected vessel.

In an embodiment, the velocity estimation module 1722 may implement a Space Time Adaptive Processing (STAP) approach for estimation of object velocity. For STAP to be applicable, a minimum of two spatial channels of data are needed, in this case one is from the Fore and the other from the Aft wing of the antenna. Example types of STAP technique which may be used for object velocity estimation include Displaced Phase Centre Antenna (DPCA) and ATI (Along Track Interferometry).

The detected object report generator module 1710 is configured to receive the object detection output and, if present, the estimated object velocity values, and generate a detected object report. Generally, the detected object report includes data describing one or more detected objects. The data may include, for example, location, characterization (object type or class), velocity, heading, etc. The detected object report may correspond to the object of interest report 1412 of processed product 1400 described above.

In an embodiment, reports provide a summary of each detected vessel. Reports may include vessel location, characteristics and radial velocity estimation. In an embodiment, one report is created for each detected vessel. In an embodiment, the report format may comprise simple text.

The detected object report is outputted to the encryption module 1716 (or the output data buffer module 1718 in embodiments not including encryption).

The image chip generator module 1712 is configured to receive the object detection output including the SAR data and data describing the detected objects (such as location in the image) and generate an image chip of each detected object. The image chip may correspond to a cropped portion of the image including the detected object.

In an embodiment, one image chip is generated for each detected object. The size of the image chip is based on the size of the object (e.g. vessel) and represents an extended bounding box around the object in the processed SAR image.

The image chips generated by the image chip generator module 1712 are outputted to the data compression module 1714.

The data compression module 1714 is configured to compress received data according to any suitable data compression scheme. The data compression module 1714 compresses the image chips to generate compressed image chips, which are outputted to the encryption module 1716 (or to the output data buffer module 1718 in embodiments without encryption). Image chips may be compressed using standard compression methods.

As pictured in FIGS. 16, 1710 and 1712 and 1714 may be performed in parallel in some examples of pipeline 1700. Performing these steps in parallel may provide a computational speed improvement to pipeline 1700. Such parallel processing may advantageously provide reduced latency.

The encryption module 1716 is configured to encrypt received data according to any suitable encryption scheme. The encryption module 1716 receives the detected object report and the compressed image chips as input and generates an encrypted detected object report and encrypted image chips. The encrypted detected object report and image chips may be assembled into a processed product, such as processed product 1400 of FIG. 13. Data is encrypted by encryption module 1716 using standard ways to encrypt satellite downlink data. Encryption module 1716 may employ commercial grade encryption. For example, the data may be encrypted per AES-CCM.

The encrypted detected object report and encrypted image chips are outputted to the output data buffer module 1718, which outputs the processed product. The output data buffer module 1718 is configured to store all object detection onboard processing outputs until they are ready to be downlinked or transmitted to another satellite.

In other embodiments of pipeline 1700, some components or modules may be omitted. For example, in embodiments wherein earth observation operations do not require elevated security, encryption module 1716 may not be required.

Figure 17:
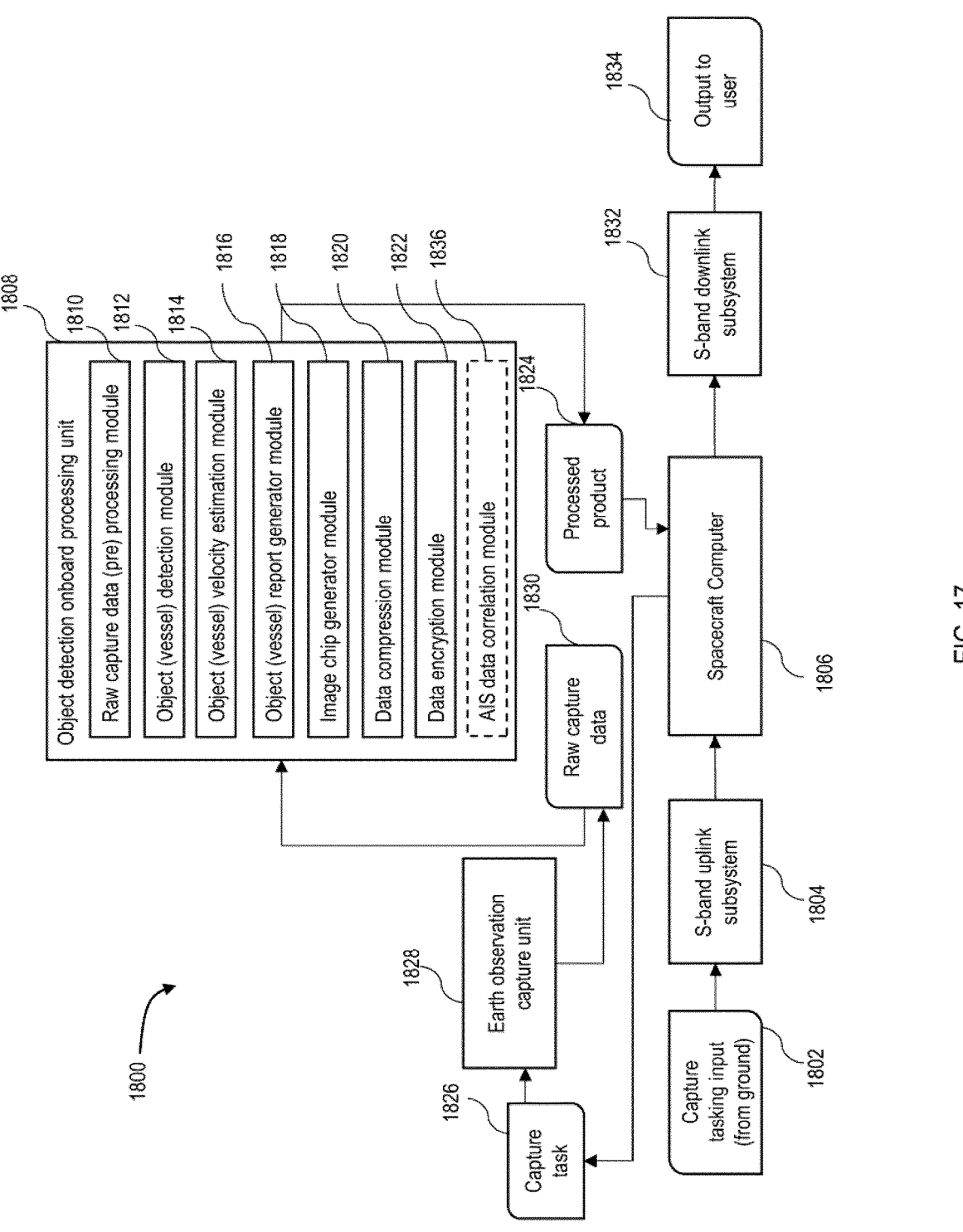
FIG. 17 is a block diagram of an object detection onboard processing architecture and data flow, according to an embodiment.

Referring now to FIG. 17, shown therein is a block diagram depicting an object detection onboard processing architecture and data flow 1800, according to an embodiment. The object detection onboard processing architecture and data flow 1800 may be implemented in an earth orbiting satellite, for example, first satellite 1102 of system 1100.

Architecture and data flow 1800 includes a capture tasking input 1802, an S-band uplink subsystem 1804, a spacecraft computer 1806, a capture task 1826, an earth observation capture unit 1828, raw capture data 1830, an object detection onboard processing unit 1808, a processed product 1824, an S-band downlink subsystem 1832, and an output to user 1834.

The object detection onboard processing unit 1808 includes a plurality of software modules which, when executed by the onboard processing unit 1808, cause the onboard processing unit 1808 to perform functions and provide functionalities as described herein. The object detection onboard processing module 1808 includes a raw capture data processing module 1810, an object detection module 1812, a detected object velocity estimation module 1814, a detected object report generator module 1816, an image chip generator module 1818, a data compression module 1820, a data encryption module 1822 and optionally a AIS data correlation module 1836. The object detection onboard processing unit 1808 may correspond to the processor 1122 as described above in reference to system 1100.

The capture tasking input 1802 comprises information communicated to the satellite via an external terminal, such as a ground terminal (e.g. first ground terminal 1104 of FIG. 8) describing an image capture task to be performed by the satellite. The capture tasking input 1802 may include or correspond to order 1300 of FIG. 12 as described above.

The capture tasking input 1802 is received via the S-band uplink subsystem 1804. The S-band uplink subsystem 1804 communicates the received capture tasking input 1802 to the spacecraft computer 1806. S-band uplink system 1804 may correspond to uplink subsystem 1118*a* as described above in reference to system 1100.

The spacecraft computer 1806 (which may include, for example, task response generator unit 332 of FIG. 3 or the like) includes a processor configured to perform data operations and issue commands to multiple systems (including onboard processing unit 1808 and earth observation capture unit 1828) aboard the spacecraft. The spacecraft computer 1806 may communicate with other such systems and components via one or more data buses. The spacecraft computer is configured to execute satellite software responsible for performance of various tasks, for example, communications with ground terminals, data storage and routing amongst the onboard systems, and attitude and orbit control.

The spacecraft computer 1806 receives the capture tasking input 1802, generates a capture task command 1826, and outputs the capture task command 1826 to the earth observation capture unit 1828.

The earth observation capture unit 1828 may correspond to the earth observation system 120 as described above in reference to system 100. The earth observation capture unit 1828 includes an imaging sensor for acquiring image data. The imaging sensor may be any sensor capable of acquiring image data and suitable for use in satellite-based imaging. For example, the imaging sensor may include an imaging radar sensor or an optical imaging sensor. In an embodiment, the imaging sensor includes a SAR sensor.

The earth observation capture unit 1828 is configured to receive the capture task command 1826 and perform an image capture task according to the command. Performance of the image capture task generates raw capture data 1830.

The raw capture data 1830 (which, in some embodiments, may be, for example, broad area SAR image data 330 of FIG. 3) is outputted from the earth observation capture unit 1828 to the object detection onboard processing unit 1808.

The raw capture data processing module 1810 receives the raw capture data 1830, and processes raw capture data 1830 into another format (processed capture data). The raw capture data processing module 1810 may correspond to the input data parser module 1702 of FIG. 16.

The object detection module 1812 receives processed capture data generated by module 1810 and process input imaging data further to detect objects of interest within the imaging data. Any object detection scheme known in the art may be applied by object detection module 1812. Object detection module 1812 may correspond to object detection module 1708 of FIG. 16.

The object velocity estimation module 1814 may receive raw capture data 1830 or processed capture data and object detection module 1812 output data, and process input data further to estimate direction and or speed of detected objects of interest. Object velocity estimation module 1814 receives data from both raw capture data processing module 1810 and object detection module 1812 for further data processing. Object velocity estimation module 1814 may correspond to object velocity estimation module 1722 of FIG. 16.

The object report generator module 1816 receives output data from object detection module 1812 and object velocity estimation module 1814 to generate and output an object report. In examples wherein the system 1800 includes AIS data correlation module 1836, the object report generator module may receive AIS correlation outputs from the AIS data correlation module 1836. Object report generator module 1816 may correspond to detected object report generator module 1710 of FIG. 16.

Image chip generator module 1818 receives the output from raw capture data processing module 1810 and object detection module 1812 and generates an image chip corresponding to a detected object identified by the object detection module 1812. For example, the image chip generator module 1818 may use bounding box coordinate data outputted by the object detection module 1812 to crop image data containing a detected object from the processed capture data. Image chip generator module 1818 outputs each image crop as an image chip. Image chip generator module 1818 may correspond to image chip generator module 1712 of FIG. 16.

The data compression module 1820 may receive input data and output corresponding compressed output data. For example, the data compression module 1820 may be configured to receive image chips generated by the image chip generator module 1818 and compress the image chip data. Any data compression known in the art may be applied by data compression module 1820. Data compression module 1820 may correspond to data compression module 1714 of FIG. 16.

The data encryption module 1822 may receive input data and output corresponding encrypted output data. Any encryption scheme known in the art may be applied by data encryption module 1822. Input data may include, for example, object report data generated by module 1816 and image chip data (or compressed image chip data). Data encryption module 1822 may correspond to encryption module 1716 of FIG. 16.

The AIS data correlation module 1836 may receive output data from object detection module 1812. AIS data correlation module 1836 may compare object detection module 1812 output to AIS data, to determine whether any detected objects comprise dark targets. In examples wherein system 1800 comprises AIS data correlation module 1836, system 1800 may be configured to acquire or receive AIS data.

In another embodiment, object detection onboard processing unit 1808 may comprise a data correlation unit, which may receive a dataset, and object detection module 1812 output, and correlate the dataset with object detection module 1812 output.

The object detection onboard processing unit 1808 outputs a processed product 1824 to the spacecraft computer 1806. The processed product 1824 may correspond to processed product 1400 as described above. The spacecraft computer 1806 may be configured to reformat the received data as required to send the data to the S-band downlink subsystem 1832, such as may be done for any other satellite data that is sent to ground (or in other cases, sent to second satellite via intersatellite link) via S-band.

The spacecraft computer 1806 outputs the processed product 1824 to the S-band downlink subsystem 1832 for transmission as an output 1834 to an end user. S-band downlink system 1832 may correspond to downlink subsystem 1118*b* as described above in reference to system 1100. The S-band downlink subsystem 1832 may send the processed product 1824 to a ground terminal. In other cases, the S-band downlink subsystem may be configured to transmit the processed product to another satellite (e.g. in a higher orbit) via an intersatellite link.

While the systems and method described are directed to earth imaging systems, the systems and method may be adapted for use on other celestial bodies, such as other planets, moons, or asteroids.

While the above description provides examples of one or more apparatus, methods, or systems, it will be appreciated that other apparatus, methods, or systems may be within the scope of the claims as interpreted by one of skill in the art.

The invention claimed is:

1. A satellite imaging system comprising:
a first satellite, a first trailing satellite, and a ground segment;
wherein the first satellite is configured to:
acquire synthetic aperture radar (SAR) image data in a first predetermined signal frequency band at a first imaging location, the first imaging location defined by first coordinates, and wherein the first satellite has a broad area imaging swath; and
transmit the SAR image data to the ground segment via a first downlink;
wherein the ground segment is configured to:
determine a second imaging location from the received SAR image data, the second imaging location defined by second coordinates, wherein the second imaging location is a prediction of an anticipated future imaging swath for at least one object based on the SAR image data; and
transmit the second imaging location to the first trailing satellite via a second uplink;
wherein the trailing satellite is configured to:
acquire image data in a second predetermined signal frequency band at the second imaging location, the image data having a higher resolution than the SAR image data, wherein the trailing satellite has a smaller imaging swath than the broad area imaging swath of the first satellite; and
transmit the image data to the ground segment via a second downlink.

2. The system of claim 1, wherein the first satellite is in an inclined orbit.

3. The system of claim 2, wherein the inclined orbit has an orbit inclination of approximately 53.5 degrees.

4. The system of claim 2, wherein the first satellite is configured to access latitude extents of approximately +/−62.5 degrees latitude.

5. The system of claim 2, wherein the second satellite is in an orbit that follows the same ground track as the first satellite.

6. The system of claim 1, wherein the first satellite is configured to acquire SAR image data having a frequency in the C-band, and wherein the second satellite is configured to acquire image data having a frequency in the X-band.

7. The system of claim 1, further comprising a second trailing satellite, and wherein the ground segment is further configured to determine whether to transmit the second imaging location to the trailing satellite or the second trailing satellite.

8. The system of claim 1, wherein the ground segment is further configured to determine an image context using the image data, and wherein the ground segment determines the image context by providing the image data as input to a machine learning model and the machine learning model generates the image context as an output.

9. The system of claim 1, wherein the image data acquired by the trailing satellite is second SAR image data.

10. The system of claim 1, wherein the image data acquired by the trailing satellite is optical image data.

11. A method comprising of satellite imaging using satellites having different resolutions, the method comprising:

acquiring C-band SAR image data at first imaging coordinates via a first satellite, wherein the first satellite has a broad area imaging swath;

transmitting the C-band SAR image data from the first satellite to a ground terminal;

determining, at the ground terminal, second imaging coordinates using the C-band SAR image data, wherein the second imaging coordinates are a prediction of an anticipated future imaging swath for at least one object based on the C-band SAR image data;

transmitting the second imaging coordinates to a second satellite; and acquiring X-band SAR image data at the second imaging coordinates using the second satellite, wherein the second satellite has a smaller imaging swath than the broad area imaging swath of the first satellite, and wherein the X-band SAR image data has a higher resolution than the C-band SAR image data.

12. The method of claim 11, further comprising transmitting the X-band SAR image data from the second satellite to the ground terminal.

13. The method of claim 12, further comprising analyzing the X-band SAR image data to determine an image context.

14. The method of claim 13, wherein analyzing the X-band SAR image data includes providing the X-band SAR image data as input to a machine learning model and generating the image context using the machine learning model.

15. The method of claim 11, wherein the C-band SAR image data is acquired in response to the first satellite receiving first imaging task data from the ground terminal via a first uplink, and wherein the first imaging task data including the first imaging coordinates.

16. The method of claim 11, wherein the first satellite is in an inclined orbit.

17. The method of claim 16, wherein the inclined orbit has an orbit inclination of approximately 53.5 degrees.

18. The method of claim 16, wherein the first satellite is configured to access latitude extents of approximately +/−62.5 degrees latitude.

19. The method of claim 16, wherein the second satellite is in an orbit that follows the same ground track as the first satellite.

20. The method of claim 11, further comprising selecting the second satellite from a plurality of satellites configured to acquire X-band SAR image data prior to transmitting the second imaging coordinates.

\* \* \* \* \*